United States Patent
Washizawa

[19]

[11] Patent Number: 6,115,480

[45] Date of Patent: *Sep. 5, 2000

[54] METHOD AND APPARATUS FOR PROCESSING VISUAL INFORMATION

[75] Inventor: Teruyoshi Washizawa, Atsugi, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,803

[22] Filed: Mar. 27, 1996

[30] Foreign Application Priority Data

Mar. 31, 1995 [JP] Japan ................................ 7-076583

[51] Int. Cl.⁷ ........................................ G06K 9/78

[52] U.S. Cl. .................... 382/103; 382/153; 382/156; 382/190; 382/291

[58] Field of Search ...................... 382/190, 153, 382/156, 157, 107, 148, 291, 298, 158, 103, 151; 348/95, 169; 706/19, 20

[56] References Cited

U.S. PATENT DOCUMENTS

| | | | |
|---|---|---|---|
| 4,692,806 | 9/1987 | Anderson et al. | 348/399 |
| 4,907,169 | 3/1990 | Lovoi | 364/513 |
| 4,958,939 | 9/1990 | Samad | 382/223 |
| 4,998,209 | 3/1991 | Vuichard et al. | 382/274 |
| 5,499,306 | 3/1996 | Sasaki et al. | 382/291 |
| 5,579,444 | 11/1996 | Dalziel et al. | 395/94 |
| 5,638,190 | 6/1997 | Geist | 358/500 |
| 5,689,581 | 11/1997 | Nakao et al. | 382/156 |

FOREIGN PATENT DOCUMENTS 6-274224  9/1994  Japan ................................ G05B 1/02

OTHER PUBLICATIONS

Bandera et al. "Foveal Machine Vision Systems." IEEE Int. Conf. on Systems, Man and Cybernetics, vol. 2, pp. 586–599, Nov. 1989.

Scott et al. "Hierarchical Multiresolution Data Structures and Algorithms for Foveal Vision Systems." IEEE Int. Conf. on Systems, Man and Cybernetics, pp. 832–834, Nov. 1990.

Concepcion et al. "Multiresolution Attention and Associative Memory Systems for Time–Varying Imagery." Proceedings 12th IAPR Int. Conf. on Pattern Recognition, vol. 1, pp. 840–842, Oct. 1994.

Baron et al. "Exploring with a Foveated Robot Eye System." Proceedings of 12th IAPR Int. Conf. on Pattern Recognition, vol. 3, pp. 377–380, Oct. 1994.

Baba et al. "Utilization of Stochastic Automata for Neural Network Learning." Proceedings of 1993 Int. Joint Conf. on Neural Networks, IJCNN '93, pp. 439–442, Oct. 1993.

(List continued on next page.)

*Primary Examiner*—Jon Chang
*Attorney, Agent, or Firm*—Fitzpatrick, Cella, Harper & Scinto

[57] ABSTRACT

A 2D image supplied from an image input unit including a wide view lens is sampled into a discrete form by an array sensor, and then mapped to a multi-resolution space by a 2D filter. The feature of the supplied image is detected, and then the mapped image is transformed to a local pattern about the detected feature, and then the coordinates of the position of the feature and the code word of the local pattern are formed into a set which is then encoded. The code is supplied to each cell of a stochastic automaton. The quantity of visual information is calculated in accordance with the quantity of mutual information between different cells of the stochastic automaton consisting of cells in blocks, the coordinates of the position of the feature and the distance from the feature to the optical axis so as to control the optical axis of the image input unit in such a manner that the quantity of visual information is maximized.

26 Claims, 18 Drawing Sheets

OTHER PUBLICATIONS

"Stochastic Relaxation, Gibbs Distributions, and the Bayesian Restoration of Image", S. Geman et al., IEEE Trans. On Pattern Anal. Machine Intell., vol. 6, No. 6, pp. 721–741, Nov. 1984.

"Task–Oriented Vision With Multiple Bayes Nets", R. Rimey et al., Active Vision With Multiple Bayes Nets, R. Rimey et al., Active Vision, Yuille (Eds.) MIT Press, 1992.

"Behavioural Constraints On Animate Vision", D.H. Ballard, Image and Vision Computing, vol. 7, No. 1, pp. 3–9, 1989.

"A New Neural Net Approach To Robot 3D Perception and Visuo–Motor Coordination", S. Lee, Internation Joint Conference On Neural Networks, vol. 1, Jun. 7–11 1992, NY, NY USA, pp. 299–307, XP000340233.

"An Active Vision System For A Location Task Using An Inhomogeneously Blurred Image", E.A. Yagi, International Conference On Neural Networks, Jun. 27–29 1994, NY, NY USA, pp. 3693–3693, XP000510501.

"Behavioural Constraints On Antimate Vision", D.H. Ballard, Image and Vision Computing, vol. 7, No. 1, Feb. 1989, pp. 3–9.

"Using Intermediate Objects To Improve The Efficiency Of Visual Search", L.E. Wixson et al., International Joint Computer Vision, 12:2/3, pp. 209–230, 1994.

"New Approaches To Robotics", R.A. Brooks, Science, vol. 25, pp. 1227–1232, 1991.

"Saccade and Pursuit On An Active Head/Eye Platform", K. Bradshaw et al., Image and Vision Computing, vol. 12, No. 3, pp. 155–163, Apr. 1994.

"On A Measure Of The Information Provided By An Experiment", D.V. Lindley, Ann.Math.Stat., vol. 27, pp. 986–1005, Apr. 1956.

"Computational Theory Of The Visual Cortical Areas", M. Kawato et al., IEICE Trans., vol. J73–D–II, No. 8, pp. 1111–1121, Aug. 1990.

"A Renormalization Group Approach To Image Processing Problems", B. Gidas, IEEE Trans. On Pattern Anal. Machine Intell., vol. 11, No. 2,, pp. 164–180, Feb. 1989.

FIG. 8
$\Omega^{(0)}$
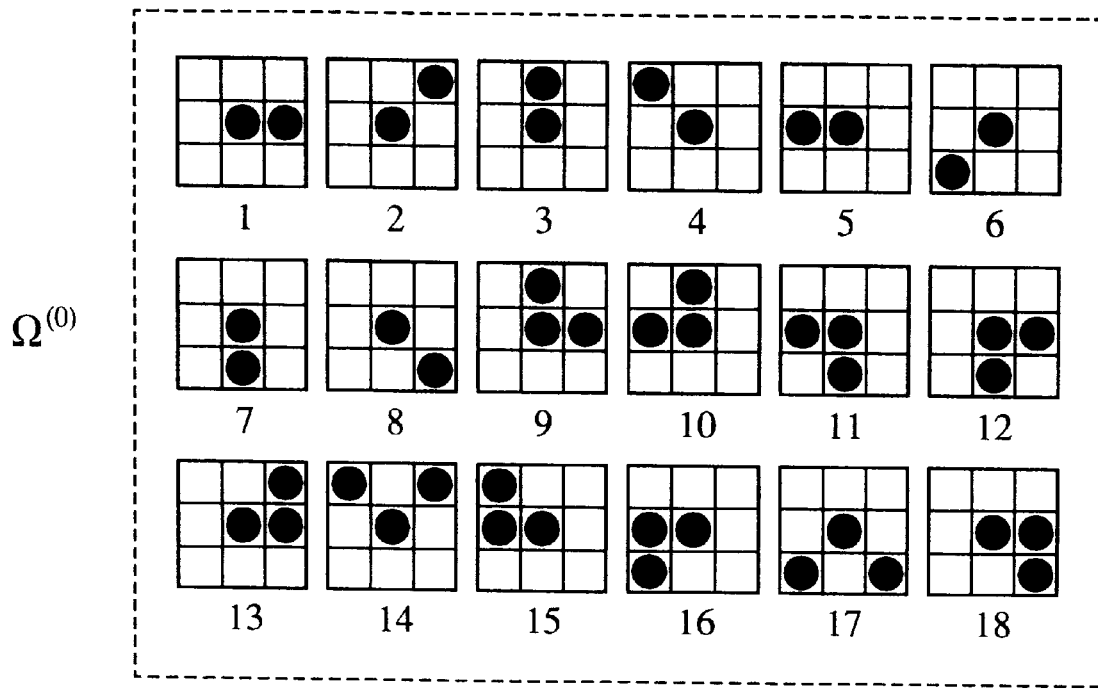
$\Omega^{(1)}$
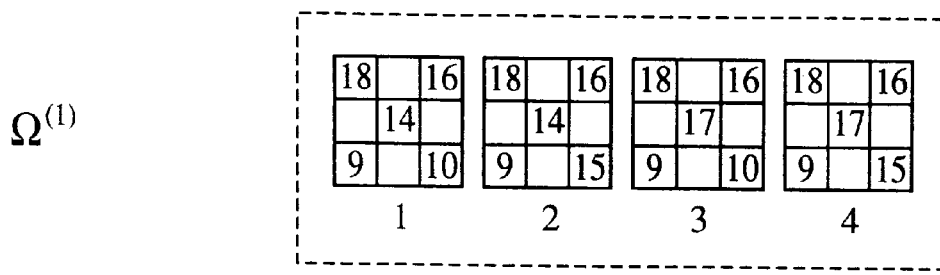
$\Omega^{(2)}$

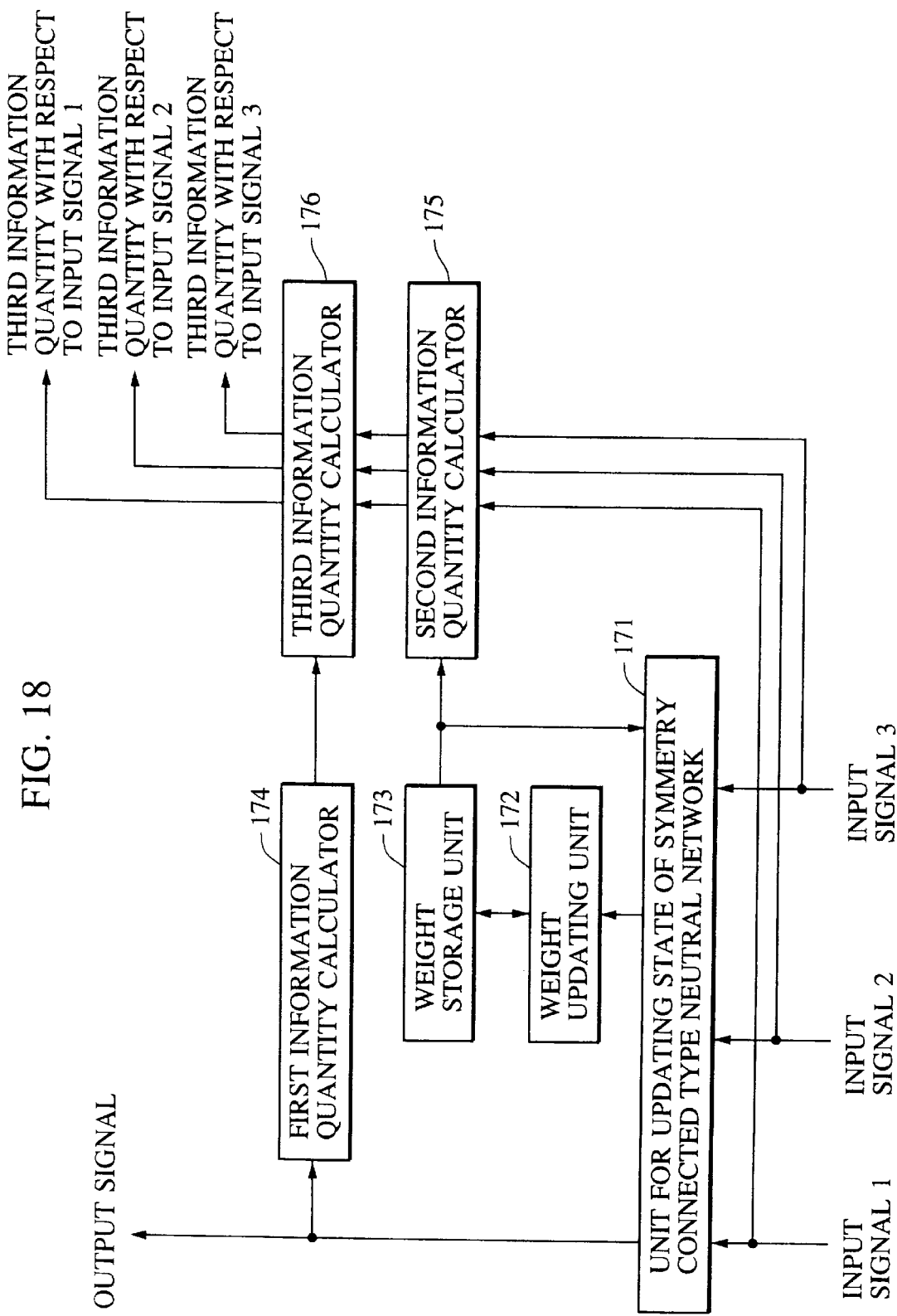

METHOD AND APPARATUS FOR PROCESSING VISUAL INFORMATION

BACKGROUND OF THE INVENTION

1. Field of the Invention

The present invention relates to a method and apparatus for processing visual information which are capable of appropriately processing visual information and which can be adapted to, for example, an input unit, an image encoding and decoding unit, an image recognition unit, an image restoring unit, a monitoring unit, an autonimic vehicle or an autonomic robot.

2. Related Background Art

Living organisms have a function capable of accurately recognizing the surrounding environment to the extent of a necessity by using a finite number of processing units and dealing with the recognized environment. The dynamic range of each signal required to recognize the environment is very wide if all possible situations are assumed. As for visual information for example, visual sensors of a living organism are, as a matter of course, finite. However, the environment extends in all azimuths. Therefore, a living organism having no transferring means must input signals with required resolutions for all azimuths to recognize the surrounding environment. If a living organism has a transferring means, that is, a means for changing the observation parameters for the sensor, the load on the visual recognition system of the living organism can be reduced considerably. The reason for this is that the places considered to be important for recognition are required to be input with sufficiently high resolutions and input is not required in the other cases.

A conventional image input apparatus has been arranged to uniformly sample a subject image, as has been performed by a CCD camera and a scanner. An image input apparatus of the foregoing type can obtain image data of finite regions with a certain resolution. If an image is considered to a portion of visual information, the essential issue in processing visual information is an assumption of three-dimensional visual information from the obtained two-dimensional image. To cope with the foregoing issue, the following two types of approaches have been performed.

Among researches and developments of the visual system of living organisms performed energetically in the nineteen-eighties, a major portion of investigations using mathematical models can be said that they have been originated from the ideal of Marr (D. Marr: "Vision" W. H. Freeman and Co. NY (1982)). The foregoing researches have been called "Computational Vision" followed by the researches being developed by means of ideas of statistic physics, such as the Regularization Theory, Markov Random Field, Line Process and application of a renormalization group. However, in the foregoing discussion, a finite number of image data items, which have been given previously, are made to be the subject as visual information in such a manner that the three-dimensional structure is estimated from two-dimensional image sets. The foregoing method corresponds to an estimation of a three-dimensional world by looking, for example, a photograph or a picture. A problem estimating the three-dimensional structure from only given information is ill-posed because the solution is intermediate. Accordingly, they have coped with the problem by using knowledge.

On the other hand, a methodology has been suggested at the same time in which the vision input system is controlled to prepare information sufficient for recognition and then the environment is recognized, that is, Animate Vision disclosed by Ballard (D. H. Ballard: "Behavioural constraints on animate vision", image and vision computing, Vol. 7, No. 1, pp.3–9 (1989)). The foregoing methodology is intended to overcome the ill-posed characteristic existing in the visual information input first by means of input data obtained by using another observation parameter. For the observation parameters, the direction of the optical axis of an optical system and zooming can be employed. The most important fact is to determine "the subject to be searched next" and "a place to be observed next", that is, a method of controlling the observation parameter.

1. Method Disclosed by Ballard et al. (D. H. Ballard and C. M. Brown: "Principles of Animate Vision", GVGIP: IMAGE UNDERSTANDING, Vol. 156, No.1, pp.3–21 (August 1992).

The vision environment recognition system comprising an image input apparatus includes two types of image input methods consisting of a foveal vision for sampling a small region adjacent to the optical axis with a high resolution and a peripheral vision for sampling a large region apart from the optical axis with a low resolution. Thus, recognition of an object can be performed without exception if it can be captured in foveal vision. Knowledge data is expressed by a tree structure, such as an IS-A tree or a part-of tree, and a probability structure is introduced into the relationship between objects. A strategy has been employed in which a utility function is defined between the quantity of information obtained after a certain operation has been completed and energy consumed to perform the operation in accordance with the foregoing tree structure and the probability structure; and the utility function is used to determine a next operation.

2. The system disclosed by Ballard et al. has employed a method of directly searching an object to be searched next. Wixson et al. has suggested an indirect searching method as an observation point control method for searching an object which is the subject (L E. Wixon and D H. Ballard: "Using intermediate objects to improve the efficiency of visual search", Int'l. J. Computer Vision, 12:2/3, pp.209–230 (1994). The indirect searching method performs a search in accordance with the spatial position relationship between an object identified by an observation and an intended object. Assuming that the intended object is a coffee cup and identified objects are a desk, a chair and a blackboard, the input system is controlled in such a manner that the position, at which the desk having the most significant spatial position relationship with the coffee cup exists, is further observed with a high resolution.

A system disclosed by Brooks et al. (R A. Brooks: "New Approaches to Robotics", Science, Vol.25, pp.1227–1232 (1991)) comprises at least two basic processing programs establishing the connection between sensor inputs and actuator outputs. Tani et al. has suggested a system having a structure such that rules existing in time sequence signal vectors of sensor inputs are as acquired by learning and the rules are used in behavior schedule (see Japanese Patent Laid-Open No. 6-274224). According to the foregoing method, a system adaptable to an unknown environment can be constituted. Moreover, a mechanism has been provided in which even if a plurality of possible actions exist, one of the actions is selected.

In addition to the foregoing conventional and representative theories, the following suggestions have been performed:

R. Rimey and C. M. Brown: "Task-Oriented Vision with Multiple Bayes Nets", in "Active Vision", A. Blake and A. Yuille (Eds.) MIT press (1992), S. Geman and D. Geman: "Stochastic Relaxation, Gibbs Distributions, and the Bayesian Restoration of Image" IEEE Trans. on Pattern Anal. Machine Intell., Vol. 6, No. 6, pp.721–741 (November 1984), B. Gidas: "A Renormalization Group Approach to Image Processing Problems", IEEE Trans. on Pattern Anal. Machine Intell., Vol. 11, No. 2, pp.164–180 (February 1989), Kawato and Inui: "Computational Theory of the Visual Cortical Areas", IEICE Trans., Vol. J73-D-II, No. 8, pp. 1111–1121 (August 1990), D. V. Lindley: "On a measure of the information provided by an exepriment", Ann. Math. Stat., vol. 27, pp.986–1005 (1956), K. J. Bradshaw, P. F. McLauchlan, I. D. Reid and D. W. Murray: Saccade and pursuit on an active head/eye platform", Image and Vision Computing, Vol. 12, no. 3, pp.155–163 (April 1994), and J. G. Lee and H. Chung: "Global path planning for mobile robot with grid-type world model", Robotics and Computer-Integrated Manufacturing, Vol. 11, no.1, pp.13–21 (1994).

However, since a major portion of the foregoing computational theories has discussed about information obtainable from given (sets of) images, the obtained results are only estimated values. Since the world has been described by using the observer-oriented coordinate systems, treatment of movable objects is too complex.

On the other hand, since the Animate Vision uses an object-oriented coordinate system to describe the world, the treatment of movable objects can relatively be simplified. However, the observation point control, which is the most important control, encounters some problems, that is:

1. A method of recognizing a minimum unit of an object constituting knowledge has not been discussed. That is, the discussion has been performed on the assumption that the recognition of the minimum unit is easy.

2. The description has been performed that the knowledge is described by a knowledge engineer. That is, knowledge of environments that is not known by human beings cannot be given.

The system disclosed in, for example, Japanese Patent Laid-Open No. 6-274224, is a system in which knowledge is acquired by learning. However, since input/output data and the structures of the neural network are general structures, hierarchical structure cannot always be acquired. Moreover, even if the neural network has the performance for acquiring the hierarchical structure, it can be expected that an excessively long time is required.

SUMMARY OF THE INVENTION

Accordingly, an object of the present invention is to provide an image information processing method and apparatus capable of quickly acquiring image information.

Another object of the present invention is to provide a variety of systems to each of which the image information processing method and apparatus are effectively applied.

According to one aspect, the present invention which achieves these objectives relates to a method of controlling an image information processing apparatus, comprising the steps of: optically receiving an image from an image input unit of the image information processing apparatus; detecting a feature from the received image; calculating quantity of visual information in accordance with the position of the detected feature; and controlling the image input portion in such a manner that the quantity of visual information is enlarged.

According to another aspect, the present invention which achieves these objectives relates to an image information processing method comprising the steps of: monitoring a supplied image; calculating an evaluation value of each feature in the supplied image; detecting a feature, the evaluation value of which is higher than a predetermined value; moving a direction of an optical axis to the detected feature; acquiring data of image near the detected feature; allotting an identifier to the acquired image data and storing a set formed by the position of the detected feature, data of the image near the feature, time of detection and the allotted identifier.

According to yet another aspect, the present invention which achieves these objectives relates to an image information processing apparatus comprising: image input means for optically inputting an image; detection means for detecting a feature from the image supplied from the image input means; calculating means for calculating quantity of visual information in accordance with the position of the feature detected by the detection means; and control means for controlling the image input means in such a manner that the quantity of visual information calculated by the calculating means is enlarged.

According to still another aspect, the present invention which achieves these objectives relates to an image information processing apparatus comprising: monitoring means for monitoring a supplied image; calculating means for calculating an evaluation value of each feature in the supplied image, which is being monitored by the monitoring means; detection means for detecting a feature, the evaluation value of which is higher than a predetermined value; moving means for moving a direction of an optical axis to the detected feature; acquiring means for acquiring data of image near the feature detected by the detection means; and storage means which allots an identifier to the acquired image data so as to store a set formed by the position of the detected feature, data of the image near the feature, time of detection and the allotted identifier.

According to another aspect, the present invention which achieves these objectives relates to an image information processing apparatus comprising: image input means controlled with an input parameter to input an image; mapping means which causes input image to be discrete to map the image to a multi-resolution space; feature detection means for detecting a feature from the input image; transform encoding means for transforming the mapped image into a local pattern about the detected feature; quantizing means for quantizing the transformed local pattern; knowledge acquiring means for obtaining time and spatial correlation between data items quantized by the quantizing means; and input parameter control means for modifying the input parameter in accordance with quantized data and the correlation.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 is a diagram showing an example of a hierarchy expression for use in the embodiment;

FIG. 18 is a diagram showing an example of the structure of a symmetry-connected-type neural network.

DESCRIPTION OF THE PREFERRED EMBODIMENTS

Figure 1:
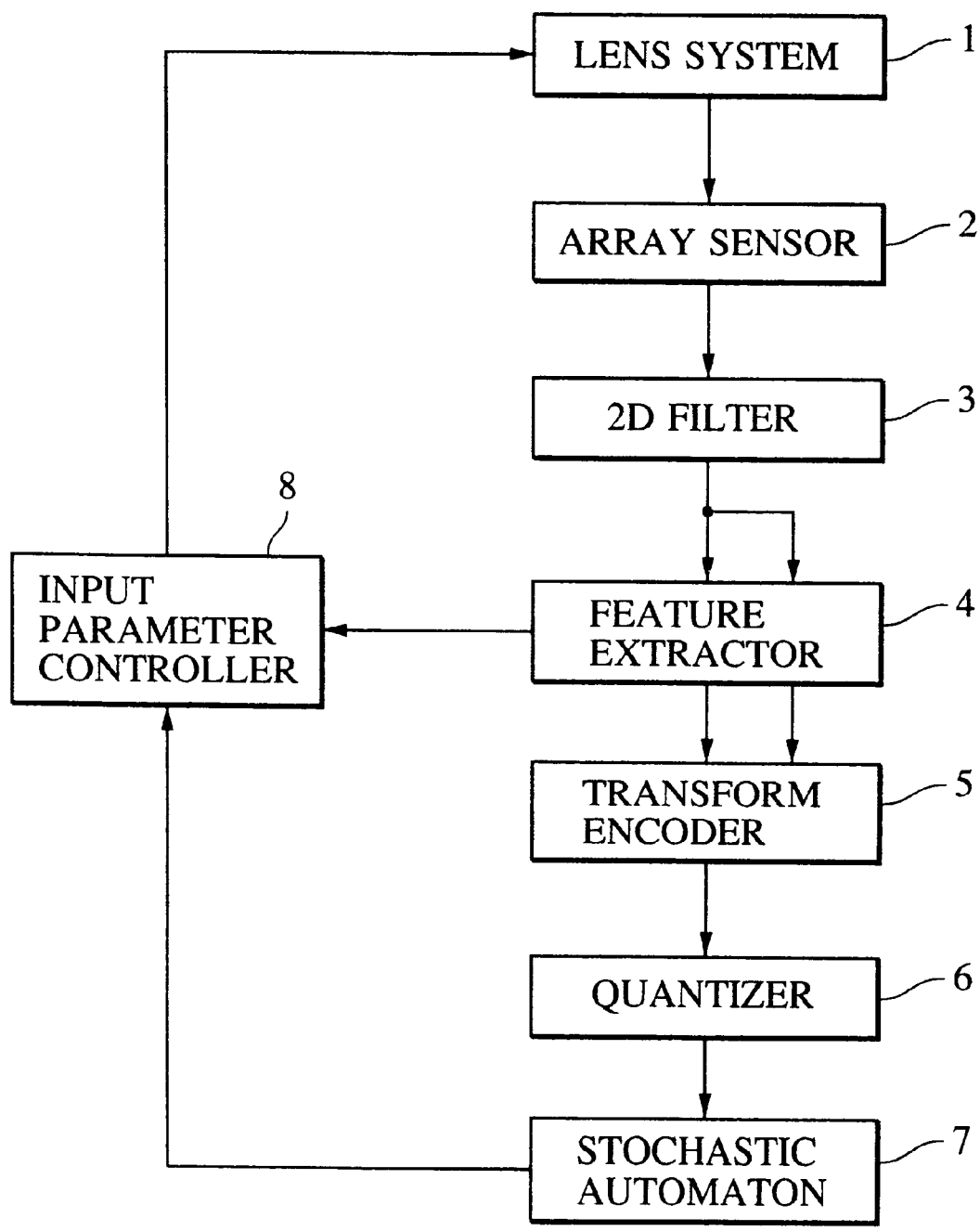
FIG. 1 is a diagram showing the block structure of a visual-information processing apparatus according to a first embodiment of the present invention.

Referring to the drawings, preferred embodiments of the present invention will now be described in detail.

First Embodiment

FIG. 1 is a block diagram showing an example of the structure of a visual-information processing apparatus according to this embodiment. The operations of the components will now be described sequentially hereinbelow.

Lens System 1

A lens system 1 is a lens system comprising a wide view lens (including a fish eye lens) arranged to optically input an image. It is noted that the lens system 1 may however comprise a standard lens.

Figure 2:
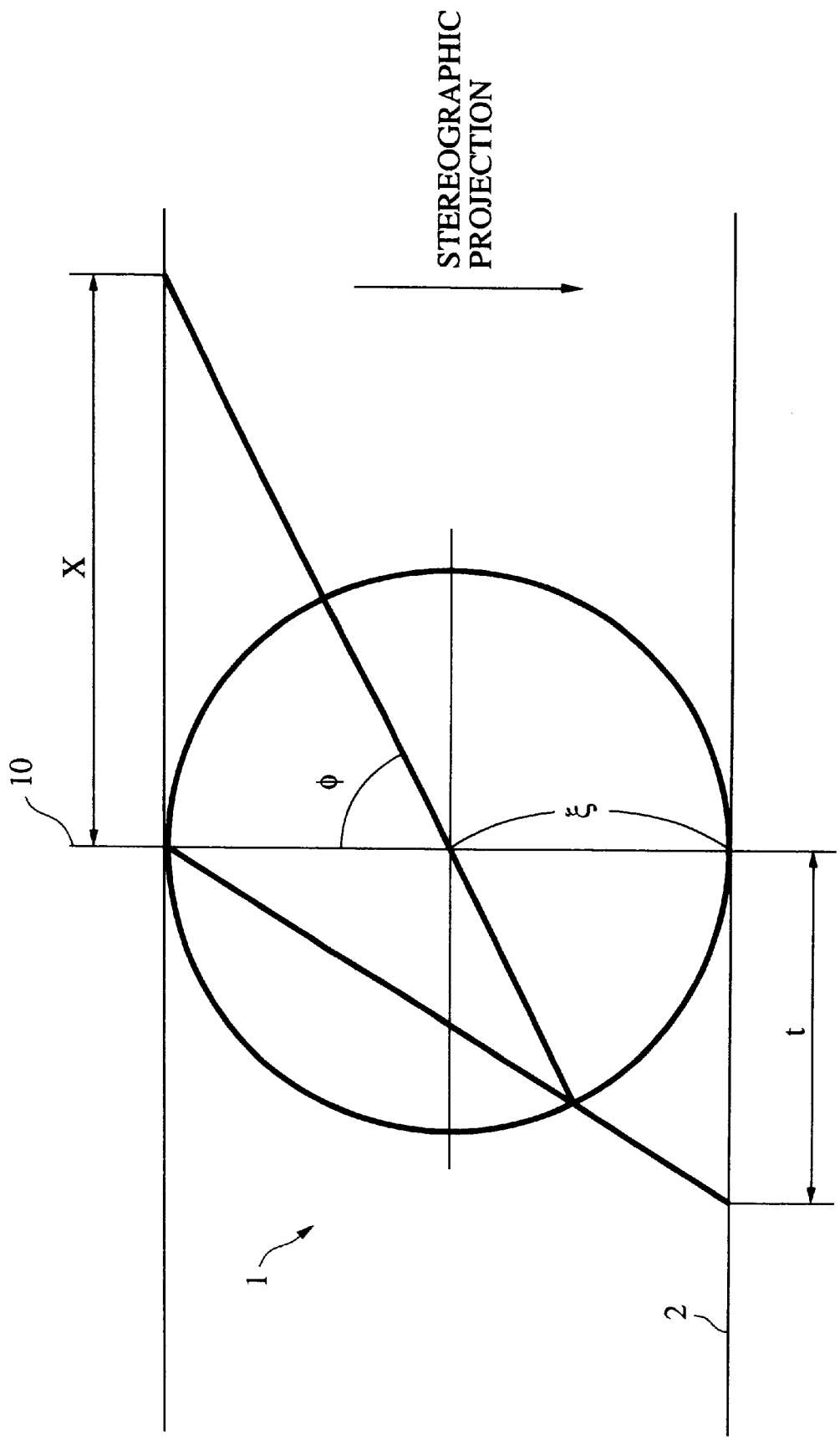
FIG. 2 is a diagram showing transform of the coordinates by a wide view lens.

FIG. 2 shows an example of coordinate transformation by means of the wide view lens of the lens system 1. Referring to FIG. 2, symbol x indicates radius vectors of a polar coordinate system on an image surface positioned in front of the input system, and t indicates radius vectors of the polar coordinate system after t has been transformed by the wide view lens. In the optical system according to this embodiment, the angle (angle θ of the polar coordinate system on a plane perpendicular to the surface of the drawing sheet) of the polar coordinate system is reserved. Therefore, the description to be performed with reference to FIG. 2 and following description will be performed about only the direction of the radius vector.

By using incident angle $\phi$ and focal distance $\xi$, x and t can be expressed as follows:

$$t = 2\xi \tan(\phi/2) \quad (1)$$

$$x = \xi \tan(\phi) \quad (2)$$

Thus, x can be expressed by the following equation as the function of t:

$$x = t/\{1-(t/2\xi)^2\} \quad (3)$$

The foregoing operation is a coordinate transformation by means of the wide view lens.

When a pattern of frequency f(0) in the radial direction extending overall image plane is, by the lends system 1, projected onto the plane of an array sensor 2, a local frequency in the radial direction at a position on the plane of the array sensor 2 apart from an optical axis 10 for distance t can be expressed by the following Equation (4):

$$f(t) = f(0) \cdot \{(1-(t/2\xi)^2)^2/\{1+(t/2\xi)^2\} \quad (4)$$

Actually, polar coordinate system (t, θ) is used so that 2D image f (t, θ) is outputted. As a matter of course, if an arbitrary object existing in a 3D actual space is made to be the subject, only the relationship between the incident angle $\phi$ and t is required to be known. Therefore, the following coordinate transformation is performed:

$$t = 2\xi \tan(\phi/2) \quad (5)$$

Note, that some wide view lenses conform to coordinate transformation rules other than the foregoing rules. Therefore, such wide view lens may be employed in the lens system 1 in place of the foregoing wide view lens.

Array Sensor 2

The array sensor 2 samples the 2D image f(t, θ), the coordinates of which have been transformed by the lens system 1 by sensors arranged in the form of a 2D array to obtain discrete 2D image. The index of an upper left sensor in the array sensor 2 is made to be (1, 1) and the index of a sensor at the m-th position in the horizontal direction and n-th position in the vertical direction is described as (m, n). Letting the integral kernel be $\Psi_{m,n}(X)$, output $g_{m,n}$ of the sensor (m,n) is as follows:

$$g_{m,n} = \langle \Psi_{m,n}(t,\theta) | f(t,\theta) \rangle \quad (6)$$

$$= \int_{t=0}^{2\xi} dt \int_{\theta=0}^{2\pi} d\theta \Psi_{m,n}(t,\theta) f(t,\theta)$$

Thus, $\{g_{m,n}\}_{m,n}$ forms a discrete 2D image.

2D Filter 3

A 2D filter 3 receives an output signal from the array sensor 2, that is, the discrete 2D image $\{g_{m,n}\}_{m,n}$, as an input thereto, followed by subjecting it to the following masking process to perform multi-resolution expansion.

$$W_{m,n} = \sum_{l=-L}^{L} \sum_{k=-k}^{k} h_{k,l} g_{m+k,n+l} \quad (7)$$

The foregoing mask uses an operation $\nabla^2 G$:

$$h_{k,l} = \frac{1}{8} \begin{bmatrix} -1 & -1 & -1 \\ -1 & 8 & -1 \\ -1 & -1 & -1 \end{bmatrix} \quad (8)$$

Also the following operator sets are effective.

(a) a plurality of operator $\nabla^2 G$ having different spatial constants: isotropy bandpass filter sets can be constituted.

(b) plural Gabor operators having different spatial constants and directions: bandpass filter sets depending upon the directions can be constituted.

Figure 3:
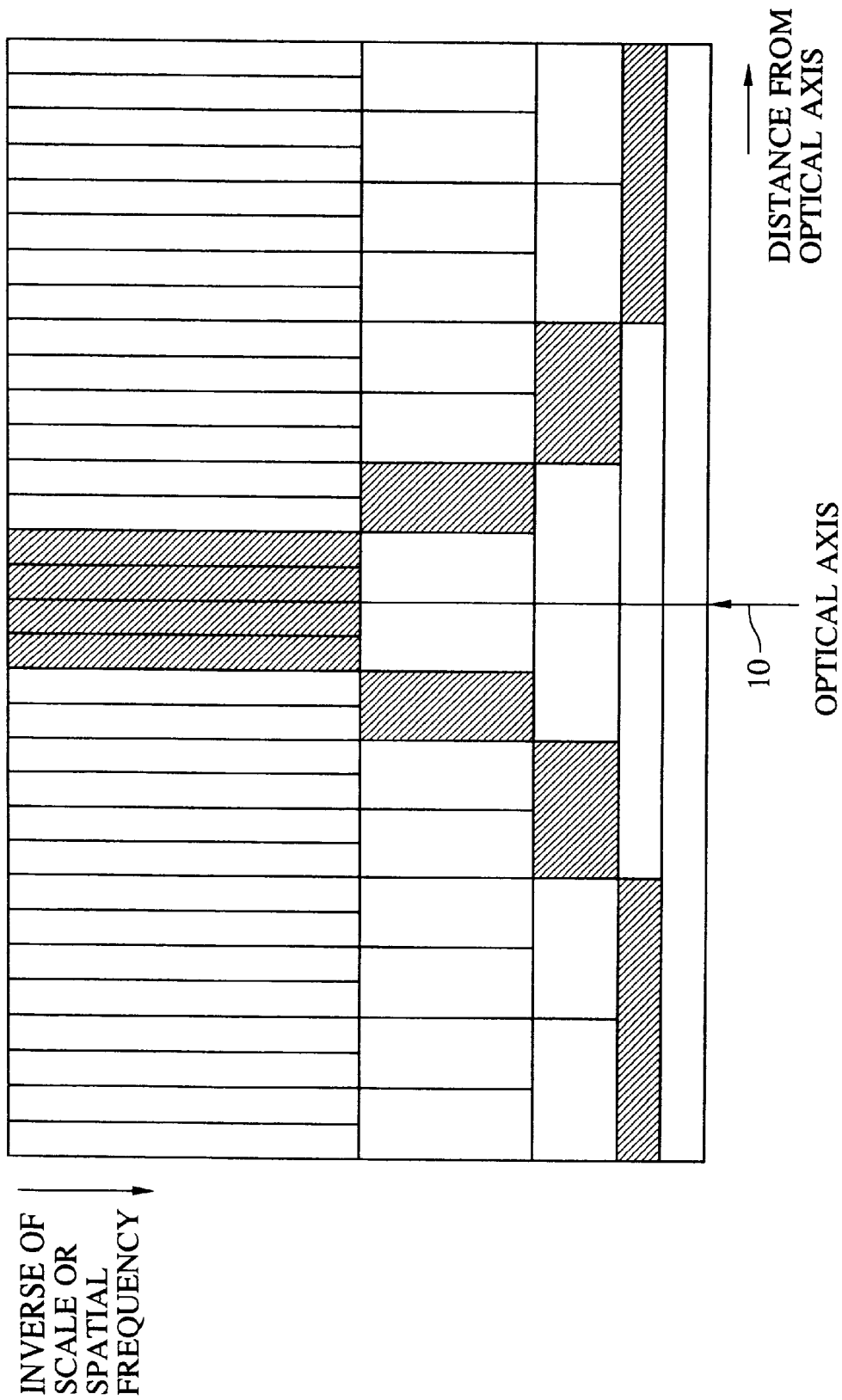
FIG. 3 is a graph showing the frequency characteristic of the wide view lens.

FIG. 3 illustrates the relationship between the frequency band in the radial direction to be detected by a system (hereinafter called wide view lens input unit) constituted by combining the lens system 1, the array sensor 2 and the 2D filter 3 and the distance from the optical axis 10. FIG. 3 shows a case where the space-invariant mask operator $\nabla^2 G$ is employed as the 2D filter 3. The foregoing system is approximately equal to an image filter constructed such that the integral kernel depending upon detection of high frequency components are deleted as the distance from the optical axis is lengthened. As can be understood from FIG. 3, change of the direction of the optical axis enables the overall region of the frequency space to be covered.

Figure 4:
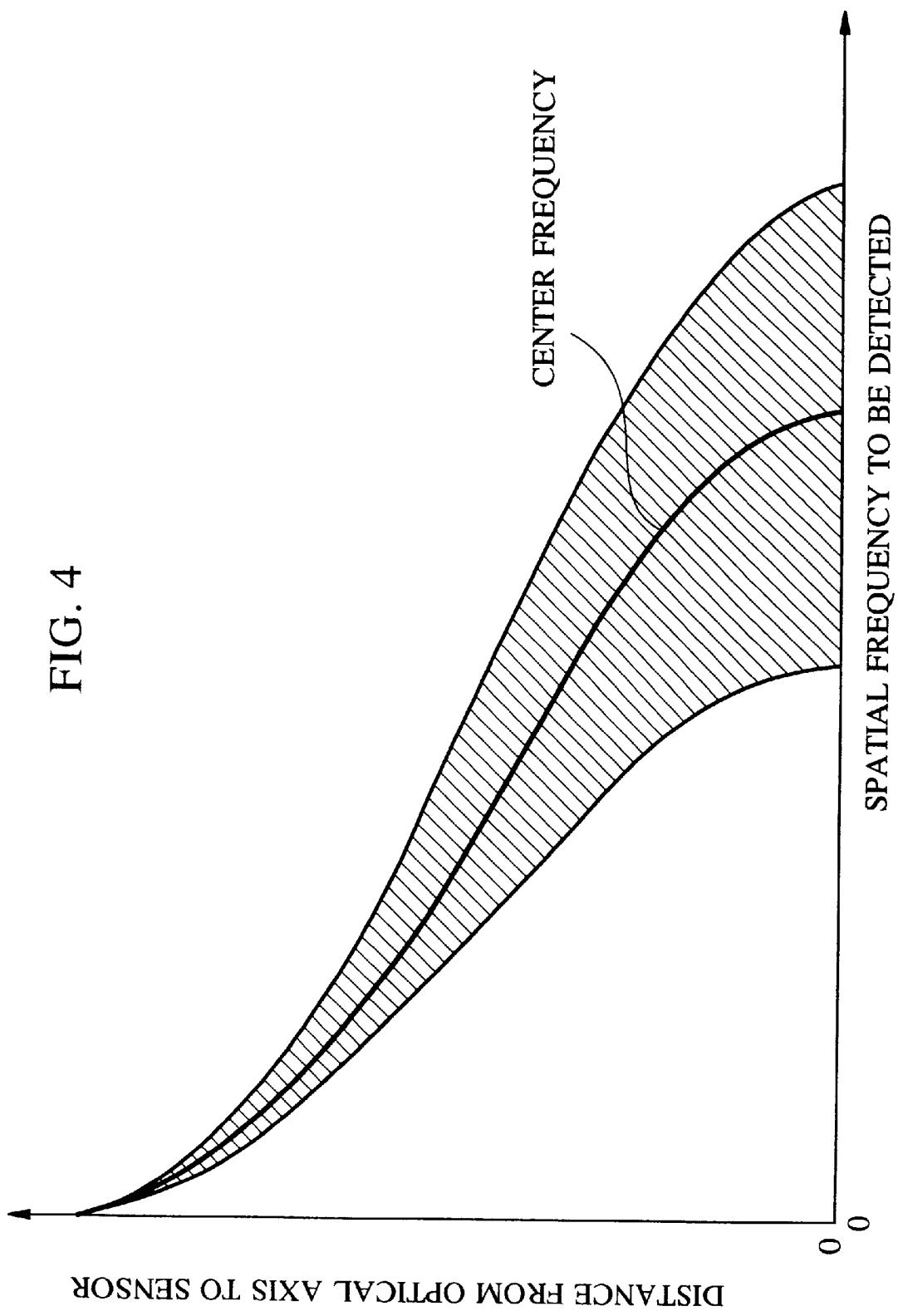
FIG. 4 is a graph showing the spatial frequency to be detected by a sensor.

The foregoing consideration can be verified with results of a simulation shown in FIG. 4. As can be confirmed from FIG. 4 that the center frequency to be detected by the wide view lens input unit is monotonously decreased as the displacement from the optical axis is enlarged. Moreover, all of components lower than the highest frequency that can be detected by the unit are detected.

Feature Extractor 4

A feature extractor 4 extracts the maximal points from an image output from the 2D filter 3 to use the maximal points as the features and output their coordinates. The coordinates of the foregoing features are transmitted to a input parameter controller 8 so as to be used to determine the quantity of control of the input parameter.

The 2D filter 3 and feature extractor 4 may be constituted as follows by using the argument principle. In the 2D filter 3, gradient ($\nabla$) is caused to effect on image $\{g_{m,n}\}_{m,n}$ so that vector field $\{\omega_{m,n}\}$ is generated.

$$\omega_{m,n} = \nabla g_{m,n} = \{(g_{m,n}-g_{m-1,n})/\Delta x\}e1 + \{(g_{m,n}-g_{m,n-1})/\Delta y\}e2 \quad (9)$$

where e1 and e2 are the elements of basis, $\Delta x$ and $\Delta y$ are grid intervals in the horizontal direction and vertical direction. Then, the direction of the vector at each point (m, n) is obtained.

$$arg(\omega_{m,n}) = \arctan[\{(g_{m,n}-g_{m,n-1})/\Delta y\}/\{(g_{m,n}-g_{m-1,n})/\Delta x\}] \quad (10)$$

If the vector field is expressed by a function of complex variable, the foregoing direction is an argument of a complex number. By using the principle of the argument, the zero point and a pole can be detected.

The argument principle will now be described. The following assumptions are performed: function f (z) is meromorphic in a simply connected domain D; C is a simple closed curve in the domain D; the zero point and the pole of f (z) do not exist on the curve C; and f (z) has zero points, the order of each of which is $\lambda_j$ at $a_j$ (j=1, 2, ..., m) and poles, the order of each of which is $\mu_k$ at $b_k$ (k=1, 2, ..., n). The angular increase $\Delta c$ arg f (z) realized after making a round of the curve C from a start point z0 can be given the following equation if the number of the zero points and that of the poles are expressed as $$Nz = \sum_j a_j \lambda_j,$$

$$Np = \sum_k b_k \mu_k:$$

$$\Delta c\ arg\ f(z) = 2\pi(Nz(f) - Np(f)) \quad (11)$$

A method of detecting the feature of the vector field $\{\omega_{m,n}\}_{m,n}$ by using the foregoing principle will now be described.

In Step 1, "n" is set to be 1.

In Step 2, "m" is set to be 1.

In Step 3, an appropriate neighbor is considered relative to (m, n). For example, 8-neighbor are selected, that is, $$\{(m-1, n-1), (m, n-1), (m+1, n-1), (m-1, n), (m+1, n), (m-1, n+1), (m, n+1) \text{ and } (m+1, n+1)\} \quad (12)$$

In Step 5, the argument principle results in the number of the zero points and poles in the region surrounded by the foregoing neighbor being given as follows, the numbers being given while the order being considered:

$$Nz(\omega) - Np(\omega) = (\Delta c\ arg\ \omega_{m,n})/2\pi \quad (13)$$

$\Delta c\ arg\ \omega_{m,n}$ is calculated as follows:

$$\Delta_c arg \omega_{m,n} = Y(\omega_{m+1,n+1}, \omega_{m-1,n}) + Y(\omega_{m,n+1}, \omega_{m+1,n+1}) + \quad (14)$$
$$Y(\omega_{m-1,n+1}, \omega_{m,n+1}) + Y(\omega_{m-1,n}, \omega_{m-1,n+1}) +$$
$$Y(\omega_{m-1,n-1}, \omega_{m-1,n}) + Y(\omega_{m,n-1}, \omega_{m-1,n-1}) +$$
$$Y(\omega_{m+1,n-1}, \omega_{m,n-1}) + Y(\omega_{m+1,n}, \omega_{m+1,n-1})$$

where $$Y(x, y) = argx - argy \text{ if } argx - argy \leq \pi argy - argx \text{ otherwise} \quad (15)$$

In Step 6, m is increased to m+1.

In Step 7, whether m is out of the range of the image is determined. If m is out of the range, the operation proceeds to Step 8. If m is not out of the range, the processes from Step 2 are repeated.

In Step 8, n is increased to n+1.

In Step 9, whether n is out of the image range is determined. If n is out of the image range, the operation is ended. If n is not out of the image range, the processes from Step 3 is repeated.

The feature extractor 4 detects points at which the number $Nz(\omega) - Np(\omega)$ obtained due to the foregoing principle of the argument is a negative value. As a result, regions in which the number of the poles is larger than the number of the zero point are detected. In a sufficiently small domain, points at which the poles exist are detected.

Transform Encoder 5

A transform encoder 5 has a function capable of transforming image data mapped on a multi-resolution space by the 2D filter 3 into a local pattern space and transmitting the transformed data.

Initially, a neighborhood of the coordinates ((Sf (=$2^k$), bf) with depth d in the multi-resolution space, Nd (Sf, bf), is defined as follows:

$$S=2^p; \; p=\{k, k-1, \ldots, Max(0, k-d)\} \qquad (16)$$

$$b=bf\pm\{(m-\tfrac{1}{2})2^p\Delta x, (n-\tfrac{1}{2})2^p\Delta y)\}; \; m,n=\{1, \ldots, 2^{k-p}\} \qquad (17)$$

where sf and bf are the scale (it may be considered to be an inverse of the spatial frequency) and the spatial coordinates of the feature detected by the feature extractor 4, respectively, and Δx and Δy are distances between sensors of the array sensor 2 in the directions x and y, respectively.

Figure 5:
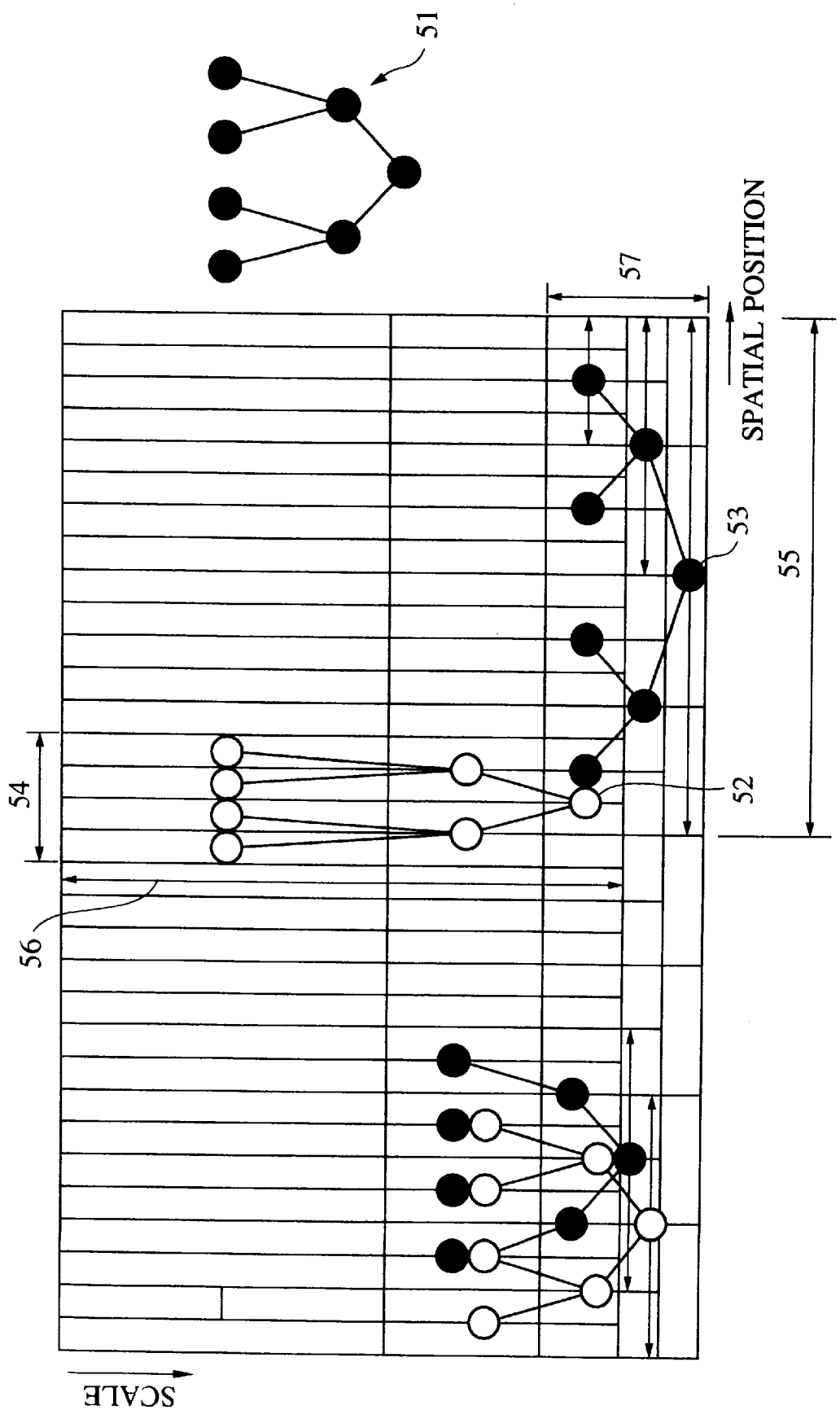
FIG. 5 is a graph showing a local pattern on a multi-resolution space.

FIG. 5 shows N2 (sf, bf) 51. If the position (sf, bf) of N2 (sf, bf) 51 is different in the multi-resolution space, the domain covered with the local pattern, that is, the actual space domain (the width of b) and the scale domain (the width of s which corresponds to the frequency domain) are different, as indicated by the reference numerals 52 and 53. Namely, the domain covered with N2 (s53, b53) is an actual domain 55 and a scale domain 57, while the domain covered with N2 (s52, b52) is an actual domain 54 and a scale domain 56. In particular, the neighborhood with depth "0" expresses the pixel at the position of the feature.

Thus, the Nα(Sf, bf) is equal to a quad tree (a binary tree in FIG. 5) having the root which is the coordinates (sf, bf) in the multi-resolution space. Local pattern Pd(sf, bf) of (sf, bf) with depth d in the coordinates in the multi-resolution space is composed by making intensity to correspond to each node of Nα (Sf, bf). The local pattern space with depth d is a functional space arranged by defining the inner product for a set of quad trees with depth d. By considering the local pattern in the multi-resolution space, the invariant of a 3D object with respect to a certain-type motion can be obtained. However, the depth (for, example, the covered range of the scale) is different depending upon the object.

The format of data to be transmitted from the transform encoder 5 with respect to a discrete multi-resolution space s={s0, s1, s2}, b {b0, b1, ..., bj, ... bJ) in an example case where only a local pattern of depth 2 is as follows:

$$\{(b_0, (P_2(s_0, b_0), P_2(s_1, b_0), P_2(s_2, b_0))), \qquad (18)$$
$$(b_1, (P_2(s_0, b_1), P_2(s_1, b_1), P_2(s_2, b_1))),$$
$$\vdots$$
$$(b_J, (P_2(s_0, b_J), P_2(s_1, b_J), P_2(s_2, b_J)))\}$$

Quantizer 6

Figure 6:
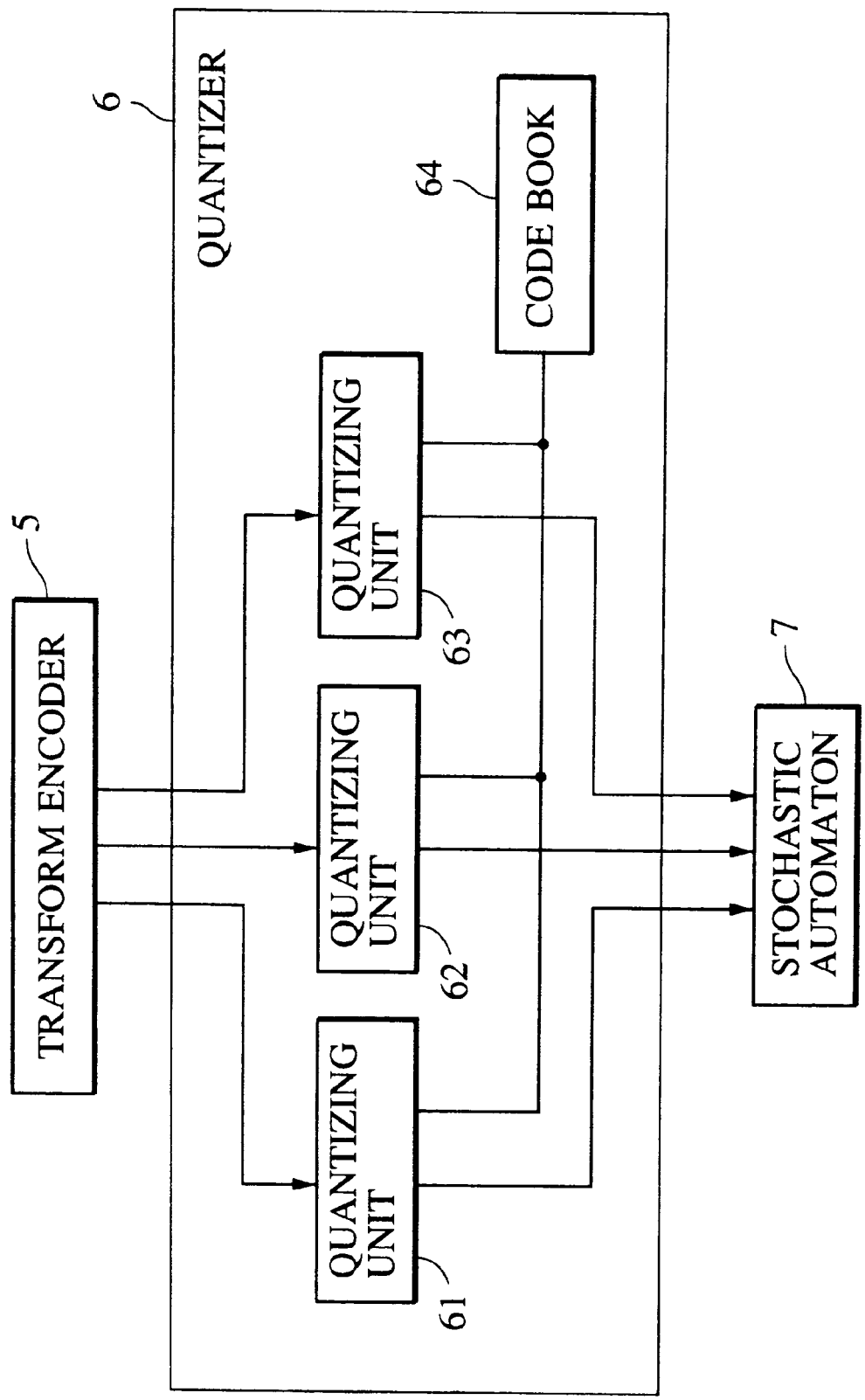
FIG. 6 is a diagram showing an example of the structure of a quantizer according to the first embodiment.

FIG. 6 shows the detailed structure of a quantizer 6. The quantizer 6 receives, from the transform encoder 5, data in, for example, the following form:

$$\{(b_0, (P_2(s_0, b_0), P_2(s_1, b_0), P_2(s_2, b_0))), \qquad (19)$$
$$(b_1, (P_2(s_0, b_1), P_2(s_1, b_1), P_2(s_2, b_1))),$$
$$\vdots$$
$$(b_J, (P_2(s_0, b_J), P_2(s_1, b_J), P_2(s_2, b_J)))\}$$

The quantizer 6 quantizes, for example, the local pattern of the foregoing data to convert the data into a code word S2 (sf, bf) ∈ Z.

$$\{(b_0, (S_2(s_0, b_0), S_2(s_1, b_0), S_2(s_2, b_0))), \qquad (20)$$
$$(b_1, (S_2(s_0, b_1), S_2(s_1, b_1), S_2(s_2, b_1))),$$
$$\vdots$$
$$(b_J, (S_2(s_0, b_J), S_2(s_1, b_J), S_2(s_2, b_J)))\}$$

The procedure to be performed by the quantizer 6 will be described in brief.

(a) Let j be 0.

(b) Data concerning feature bj, that is, the following data is supplied to the quantizer 6 in the case of the initial case:

$$(b0,(b0,(P2(s0, b0), P2(S1,b0), P2(s2,b0))))) \qquad (21)$$

(c) Data items P2(s0, b0), P2(S1,b0), P2(s2,b0) respectively are supplied to quantizers 61, 62 and 63 and corresponding codes words S2(s0, b0), S2(S1,b0), S2(s2,b0) are transmitted. At this time, all of the quantizers 61, 62 and 63 use a code book 64.

(d) (b0,(S2(so, b)), S2(S1,b0), S2(S1,b0), S2(s2,b0))) is transmitted.

(e) Let j←j+1, and then the operation returns to step (b).

The quantizer 6 has a learning mode for acquiring the representative vector and an execution mode for encoding the supplied signal, the foregoing modes being enabled to be realized by a usual vector quantizing technique.

The code book 64 gives number (code word) to the foregoing local pattern expressed as a set of component intensities at each node position. For example, the code book 64 may be constituted by a learning vector quantizing process to be described later in a second embodiment. As an alternative to this, numbers may sequentially be allotted to all of appearing local patterns.

That is, the given image is encoded as a set of the coordinates of the position of the feature and the code word of the local pattern. However, the foregoing encoding contains considerable redundancy in a sense that an intense correlation exists between local patterns which are spatially adjacent. It is preferable that the representative vector of the quantizer 6 does not contain the redundancy. The foregoing redundancy can be reduced by using simultaneous appearance probability between the respective representative vectors.

Stochastic Automaton 7

A set of the coordinates of the position of the feature and the code word of the local pattern transmitted from the quantizer 6 is supplied to each cell of a stochastic automaton 7.

Figure 7:
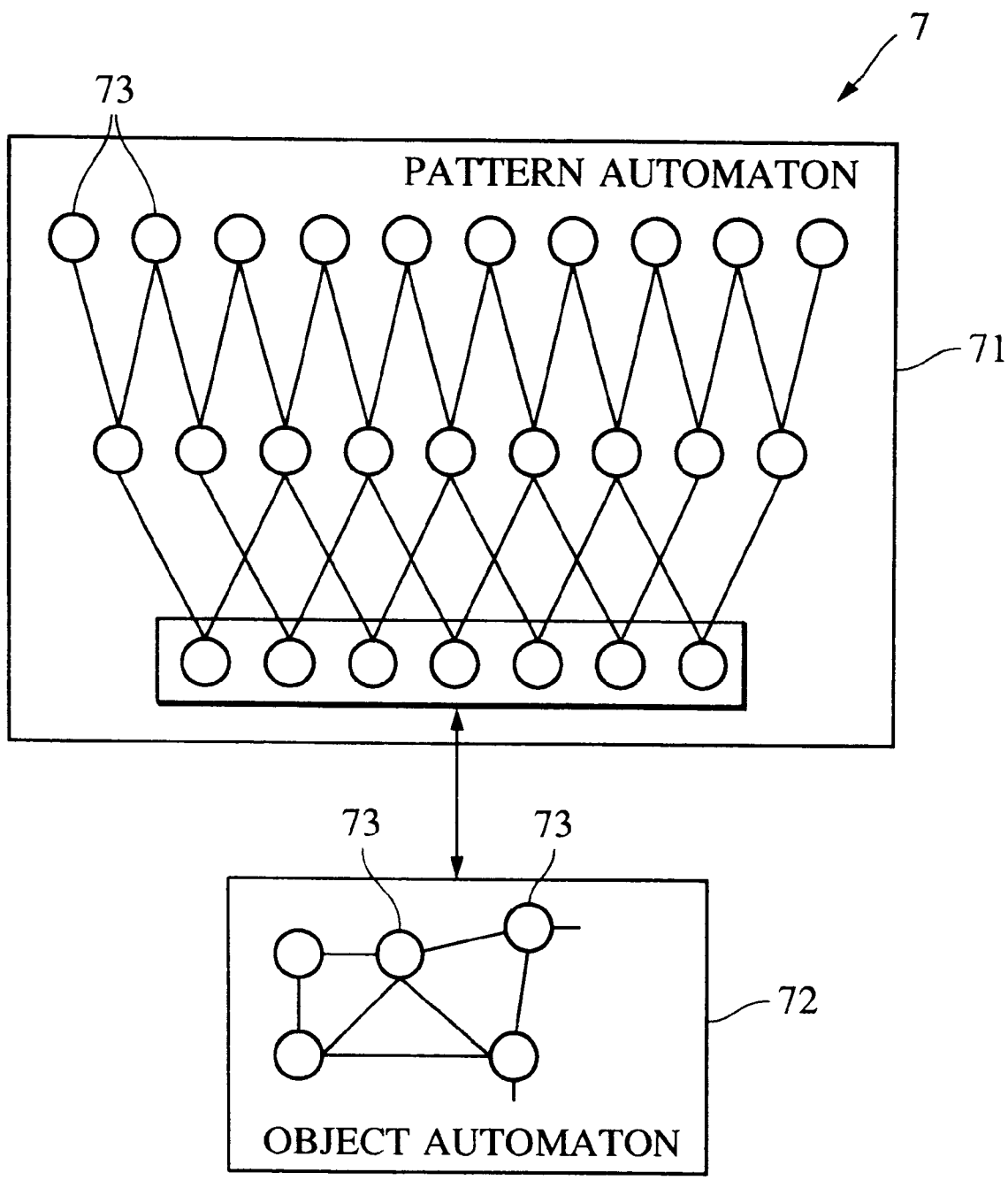
FIG. 7 is a diagram showing an example of a stochastic automaton according to the first embodiment.

FIG. 7 shows an example of the structure of the stochastic automaton 7. Referring to FIG. 7, reference numeral 71 represents a pattern automaton constituted in accordance with the geometric characteristic of the supplied image data and the time correlation. Reference numeral 72 represents a symbol automaton constituted in accordance with a result of the foregoing pattern network and in response to another input signal, for example, knowledge data supplied from a human being using a keyboard and another sensor signal or the like. Reference numeral 73 represents a cell having finite states. A probability structure is defined on a set of status values. A set of states of the r-th cell belonging to the (q)-th layer is written as $\Omega r^{(q)}$, the probability distribution on the set is written as $\{p(\omega u)\}$; $\omega u \in \Omega r^{(q)}$, a set of states of the v-th cell belonging to the (q+1)-th layer is written as $\Omega v^{(q+1)}$, the probability distribution on the cell is written as $\{p(\omega z)\}$; $\omega z \in \Omega v^{(q+1)}$. An assumption is performed that the probability distribution relates to one another with the following conditional probability:

$$p(\omega_z \in \Omega_v^{(q+1)}) = \prod_r \sum_{\omega_u \in \Omega_r^{(q)}} p(\omega_z | \omega_u) p(\omega_u) \quad (22)$$

where p ($\omega$u) indicates the probability that the r-th cell in the q-th layer is $\omega$u, and p($\omega$z|$\omega$u) indicates the probability (conditional probability) that the v-th cell in the (q+1)-layer is $\omega$z when the v-th cell in the q-th layer is $\omega$u.

Cells belonging to the pattern automaton 71 are allotted to corresponding partial domains when the multi-resolution space is divided. Therefore, the status value of the cell accurately corresponds to the code word in a partial domain in the multi-resolution space. The state transition matrix having the conditional probabilities as the elements is calculated simultaneously with learning of the code book 64 of the quantizer 6 is learned.

On the other hand, cells belonging to the symbol automaton 72 accurately correspond to objects or events. The conditional probability between the foregoing elements may be given from a knowledge engineer or may be calculated in accordance with the time and spatial correlation of the supplied image data.

An example of a three-level hierarchy expression in a case where the multi-resolution expression is not performed by the transform encoder 5 is shown in FIG. 8. The configuration space at the foregoing level is constituted by the spatial arrangement of the (3×3) configuration space in the level lower than the foregoing coordinate space by one. That is, $\Omega^{(0)}$ is a set of patterns formed by arranging pixels having real number values into the form of (3×3), and $\Omega^{(1)}$ is a set of patterns formed by arranging codewords for the patterns belonging to $\Omega^{(0)}$ into the form of (3×3). Therefore, if the conditional probability between the layers exists as a model and the a priori probability with respect to 18 patterns belonging to $\Omega^{(0)}$ is given, the probability distribution of the patterns belonging to $\Omega^{(1)}$ and $\Omega^{(2)}$ can be calculated successively.

Note that the stochastic automaton 7 according to the first embodiment and a Hopfield-type neural network 207 according to a second embodiment are also called collectively as a knowledge acquiring unit.

Input Parameter Controller 8

The input parameter controller 8 is a component arranged such that, in accordance with the coordinates of the feature supplied from the feature extractor 4 and the pattern probability distribution supplied from the stochastic automaton 7, it transmits, to the wide view lens input unit, input parameter control signals representing, for example, the direction of the optical axis of the lens and zooming. For example, as for the direction of the optical axis, the input parameter controller 8 performs the following process.

An optical axis control method depends upon selection of a feature in the set of the features detected by the feature extractor 4. For example, the selection evaluation criterion is defined by the following equation:

$$Lbr = L(wbr, T(br, \Omega v^{(q+1)}), \rho(br)) \quad (23)$$

where wbr is an output value from the normalized 2D filter 3 at the feature point br, the second term of the right hand side is the quantity of mutual information of feature point br with respect to $\Omega v^{(q+1)}$ and $\rho(br)$ is the distance from the present optical axis to br. A simplest example of Lbr is considered to be a linear combination of the respective variables.

$$Lbr = \alpha 0\ wbr + \alpha 1\ T(br, \Omega v^{(q+1)}) + \alpha 2 \rho(br) \quad (24)$$

Initially, mutual information quantity $T(\Omega r^{(q)}, \Omega v^{(q+1)})$ of $\Omega r^{(q)}$ with respect to $\Omega v^{(q+1)}$ is defined by the following Equation (25). Equation (25) is used to calculate $T(br, \Omega v^{(q+1)}) = T(\Omega r^{(0)}, \Omega v^{(q+1)})$.

$$T(\Omega_r^{(q)}, \Omega_v^{(q+1)}) = \sum_{\Omega_r^{(q)}} p(\omega_u) \sum_{\Omega_v^{(q+1)}} p(\omega_z | \omega_u) \log p(\omega_z | \omega_u) - \sum_{\Omega_v^{(q+1)}} p(\omega_z) \log p(\omega_z) \quad (25)$$

The quantity of modification of the optical axis is determined in such a manner that the optical axis is made to coincide with the spatial coordinates with which the Equation (23) or (24) can be made to be maximum. Each cell of the pattern automaton 71 has both actual space coordinates and the scale coordinates. Therefore, making the optical axis to coincide with the (observation) position, at which the mutual information quantity is the maximum, is the same as detection of a cell having the maximum mutual information quantity. Each cell stores the code word and the corresponding appearance probability. Moreover, the cells are connected to one another with the conditional probability. Therefore, a most effective cell, that is, the cell having the maximum mutual information quantity, can be determined by using the foregoing factors to determine the state of a cell having a certain characteristic (the determination is the same as the entropy of the appearance probability of the code words of the specific cell is lowered). The cell is determined by performing calculations using Equations (23) to (25).

Note that the foregoing Equations (23) to (25) can be made to be evaluation values for zoom control if the equations are applied to the multi-resolution space or its local pattern. The calculations and evaluations of the evaluated value according to the present invention are not limited to the Equations (23) to (25).

Specific Example of the Embodiment

To describe the advantage of the present invention, an example will now be described in which the theory according to the present invention is applied to a simple example. To simplify the description, an example will now be described in which a (3×3) array sensor is used and the multi-resolution expression by the operations of the wide view lens and the transform encoder is not performed. It can be considered that the first term of Equation (24) is the change quantity (black/white) of pixel data.

An assumption is performed that the input unit is able to recognize a range of (3×3) pixels at a time and it has a model formed as shown in FIG. 8 as knowledge. The description will be performed about a case where only a pattern automaton is used to recognize a 2D pattern. As can be understood from FIG. 8, the spatial support of a level (0) pattern is formed by 3×3 pixels, the spatial support of a level (1) pattern is formed by 9×9 pixels and the spatial support of a level (2) pattern is formed by 27×27 pixels. Therefore, the system is able to recognize the level (0) pattern by performing one observation operation. Numeric characters appearing in the level (1) pattern and the level (2) pattern respectively are codewords of the level (0) and the level (1). An assumption is performed that the appearance probabilities with respect to the respective level patterns are the same. Then, the operation for recognizing the level (1) pattern will be written as level (1) observation.

Figure 9:
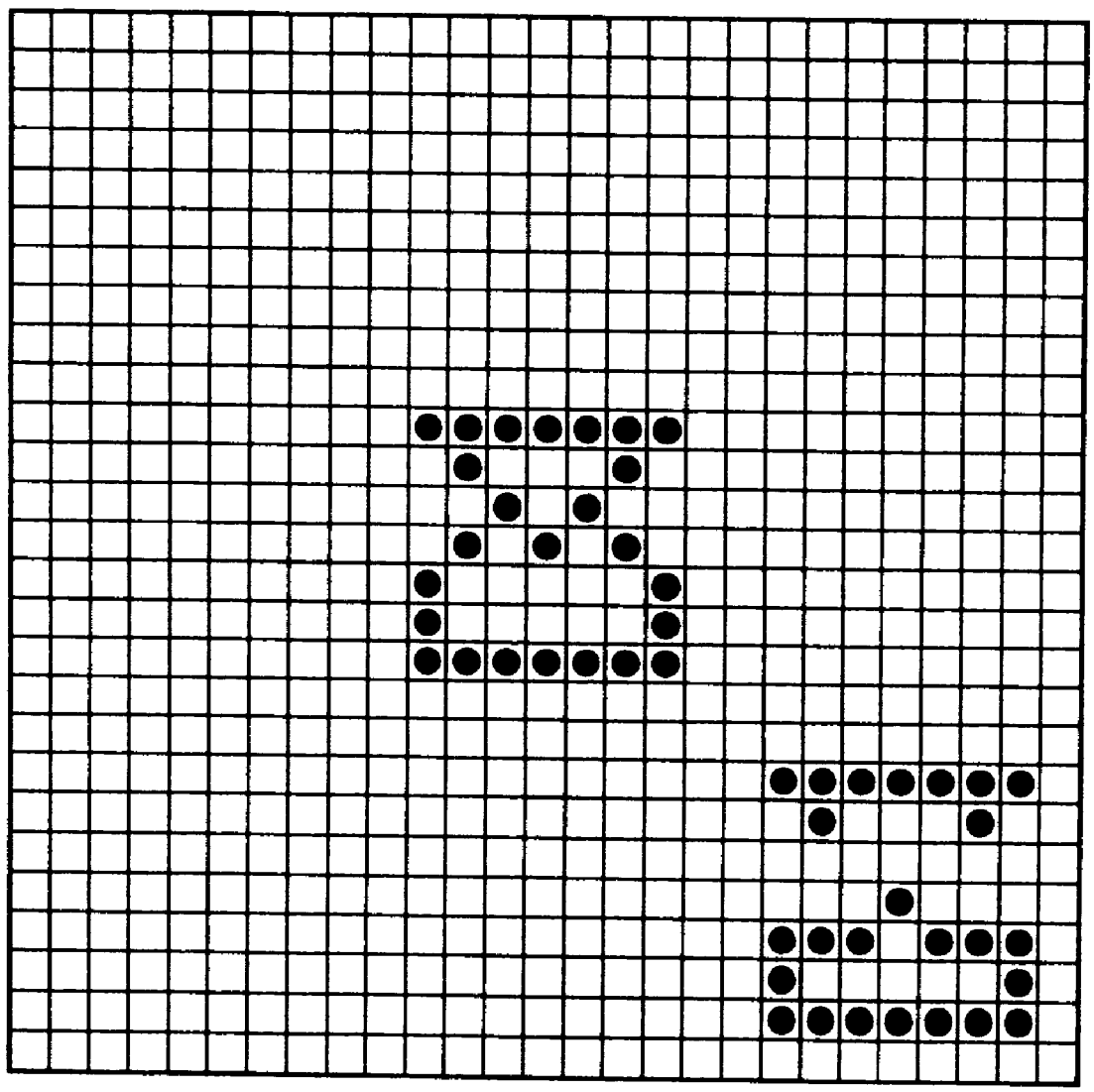
FIG. 9 is a diagram showing an example of a vision environment for use in the embodiment.

Assuming that a pattern shown in FIG. 9 has been given as the vision environment, an issue for recognizing the level (2) pattern will now be considered. Referring to FIG. 9, the upper left point is written as origin (0, 0) and a pixel shifted to the i-th right position and shifted downwards to the j-th position is expressed as (i, j). Since the system knows only the two level (2) patterns, it is required to specify the pattern to which the pattern of the given image is included.

FIG. 9 shows an input image to be supplied to the apparatus according to this embodiment, the image being formed into a form expressed by Equation (13) after it has been processed in the transform encoder 5 and the quantizer 6 (note that redundant portions are deleted).

A topmost cell of the pattern automaton 71 shown in FIG. 7 has a buffer for storing the appearance probability with respect to 18 code words included in $\Omega^{(0)}$ shown in FIG. 8. Each cell in the uppermost layer of the pattern automaton 71 takes pattern matching between partial images (partial images of the supplied image, which is the 3×3 partial image in this embodiment) existing in a spatial domain which is the territory thereof, and 18 local patterns contained in $\Omega^{(0)}$ shown in FIG. 8 so as to store the corresponding code word and its appearance probability. If a partial image corresponding to a certain cell in the first layer has not been obtained, the cell in the first layer allots the same appearance probability "1/18" to all code words. If the partial image has been detected to be the local pattern "1" or "2", it stores "½" as the appearance probability of each of code word 1 and code word 2 and stores "0" as the appearance probability of each of other code words.

Each cell of the pattern automaton 71 stores code words corresponding to four patterns contained in $\Omega^{(1)}$ shown in FIG. 8 and their appearance probabilities. Note that the "pattern" is the spatial arrangement of the code word of the cell in the first layer. That is, the local arrangements of the code words of the cell in the first layer are represented by numeric characters "1" to "4". The determination of the arrangement of the code word of the first layer in the partial space, which is the territory of the cell in the second layer, from among "1" to "4" is calculated by using Equation (22). Note that 3×3 patterns are multiplied as expressed in Equation (22). Also the cells in the third layer are subjected to calculations for obtaining the appearance probability with respect to the two code words by using Equation (22).

Assuming that the initial level (0) observation has been performed at the position, the coordinates of which are (10, 10), the successive processes will be described sequentially. The coordinates (10, 10) may be considered to be detected by the feature extractor.

Step S1

Information obtained by the level (0) observation of the coordinates (10, 10) indicates that the level (0) pattern is "18". Thus, a fact that the amount of the foregoing information is 0 can easily be understood. In order to make the position, which is observed by the system, and the relative position of the level (2) pattern to correspond to each other, the system is required to specify the level (1) pattern near the present observation point.

To complete the level (2) observation, the entropy at $\Omega^{(2)}$ must be minimized. That is, an observation point (i, j) capable of maximizing T ($\Omega(i, j)^{(1)}, \Omega(10, 10)^{(2)}$) is selected. As the candidates of the observation point, the following four points are selected: {(16, 10), (13, 13), (10, 16) and (16, 16)}. The expected value of the information quantity when each point has been observed are as follows:

$$T(\Omega^{(1)}_{(16,10)}, \Omega^{(2)}_{(10,10)}) = 0.219, \qquad (26)$$

$$T(\Omega^{(1)}_{(13,13)}, \Omega^{(2)}_{(10,10)}) = 0.354,$$

$$T(\Omega^{(1)}_{(10,16)}, \Omega^{(2)}_{(10,10)}) = 0.219,$$

$$T(\Omega^{(1)}_{(16,16)}, \Omega^{(2)}_{(10,10)}) = 0.354.$$

If an observation point, the distance from which is short, is selected from the foregoing candidates, (13, 13) is selected as a next observation point. The conditions about the distance is not limited to this.

Step S2

Level (0) observation at coordinates (13, 13) is performed. As a result, level (0) pattern "14" is obtained. In this state, the level (1) pattern relative to the coordinates (13, 13) cannot be specified. Accordingly, the level (0) observation at the coordinates (16, 16) is performed similar to Step S1. As a result, level (0) pattern "10" is obtained so that the level (1) pattern at the coordinates (13, 13) is specified to "1". The quantity of information at each observation point in the level (2) is calculated. The candidate of the observation point is a point in the level (1), the coordinates of which is (22, 22). That is, whether the level (2) pattern at the coordinates (22, 22) is "2" or "3" is specified. The expected values of the quantity of information when the candidate points of the observation point of the level (0) are as follows:

$$T(\Omega^{(1)}_{(19,19)}, \Omega^{(2)}_{(16,16)}) = 0.171,$$

$$T(\Omega^{(1)}_{(25,19)}, \Omega^{(2)}_{(16,16)}) = 0.171,$$

$$T(\Omega^{(1)}_{(22,22)}, \Omega^{(2)}_{(16,16)}) = 0.585,$$

$$T(\Omega^{(1)}_{(19,25)}, \Omega^{(2)}_{(16,16)}) = 0.171,$$

$$T(\Omega^{(1)}_{(25,25)}, \Omega^{(2)}_{(16,16)}) = 0.585.$$

As a next observation point, a point (22, 22) are selected because the distance is short.

Step S3

As a result of the level (0) observation at the coordinates (22, 22), level (0) pattern "17" can be obtained. Thus, whether the level (1) pattern is "3" or "4" can be detected. As a result, a fact that the given input signal is "2" of the level (2) pattern can be recognized.

Although the foregoing embodiment has not considered the multi-resolution space and its local pattern to simplify the description, a similar process can be performed with complexity in the process even if the multi-resolution space and the local pattern are considered. When the multi-resolution space and the local pattern are considered, zoom control and the like can be performed as well as the control of the optical axis.

Second Embodiment

A second embodiment has a structure such that the stochastic automaton 7 according to the first embodiment is realized by a Hopfield-type network. As a result, the process to be performed in an input parameter controller 208 is changed.

Figure 10:
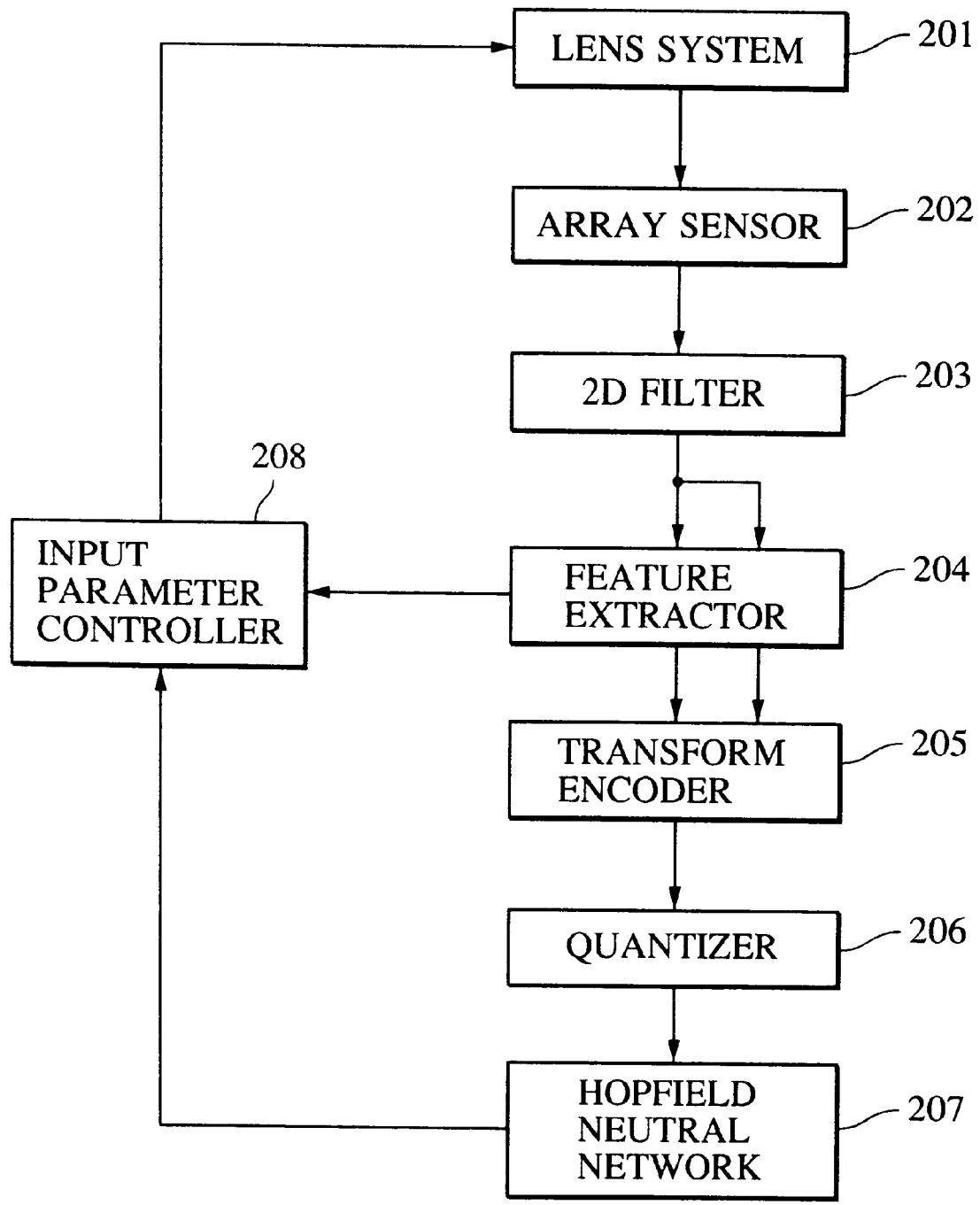
FIG. 10 is a block diagram showing an example of the structure of a visual-information processing apparatus according to a second embodiment.

FIG. 10 is a block diagram showing an example of the structure of a visual-information processing apparatus according to this embodiment. A lens system 201, an array sensor 202, a 2D filter 203, a feature extractor 204 and a transform encoder 205 respectively are same as the lens system 1, the array sensor 2, the 2D filter 3, the feature extractor 4 and the transform encoder 5 according to the first embodiment.

Quantizer 206

Figure 11:
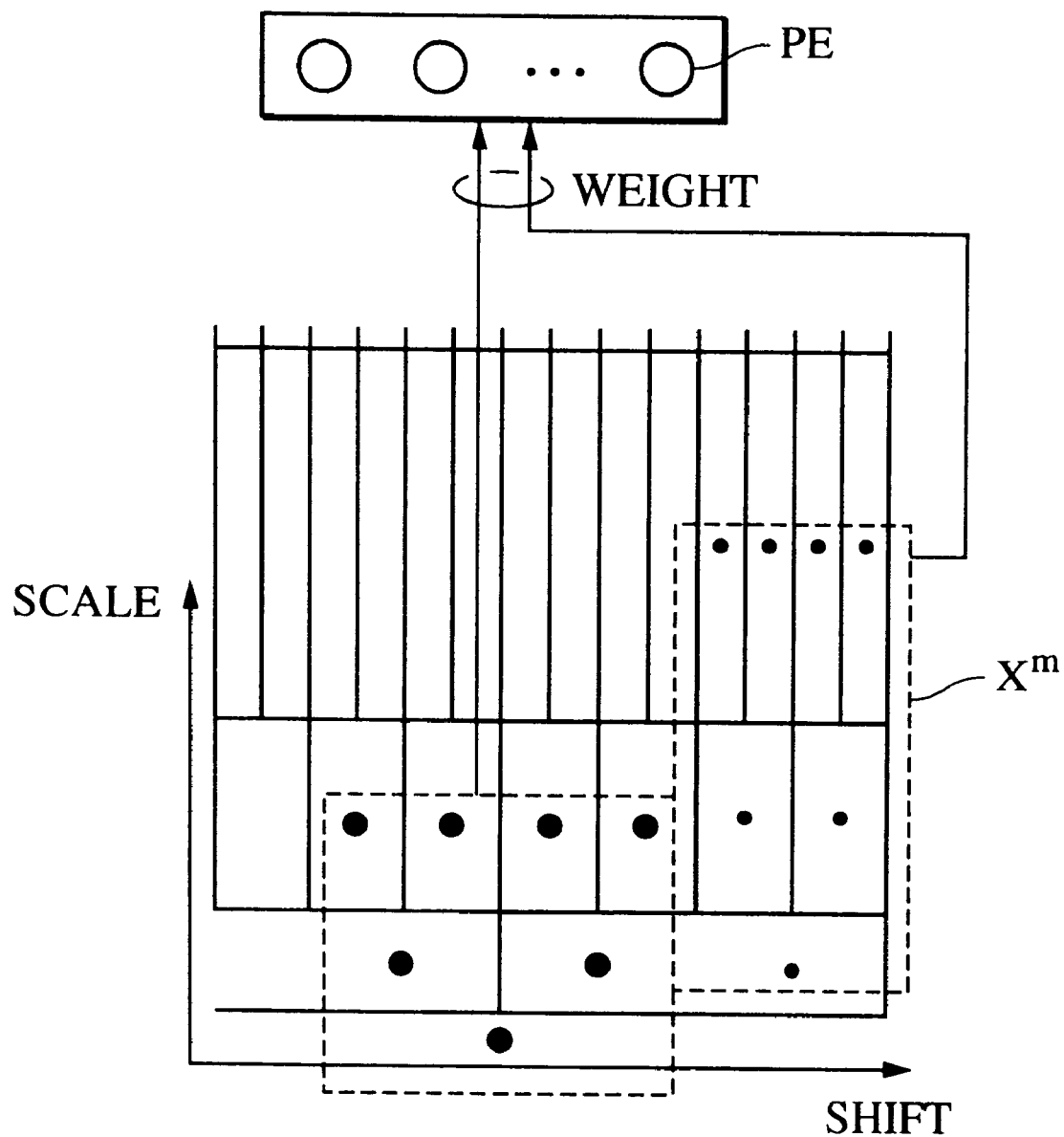
FIG. 11 is a diagram showing an example of the structure of a quantizer according the second embodiment.

FIG. 11 shows the structure of a quantizer 206. The quantizer 206 has a learning mode for acquiring representative vectors and an execution mode for encoding the supplied signal. The representative vectors are acquired in the learning mode by a method using a correlation matrix or a method using a learning vector quantizer suggested by Kohonen. Then, a method will now be described in which the learning vector quantizer suggested by Kohonen is used to constitute a quantizer having depth m.

(a) Weight vectors $Wn^m$ are prepared by the number corresponding to the number of the representative vectors; and then the weight vectors are initialized by a small random number.

(b) Processing elements $PEn^m$ for transmitting the scalar product of the local pattern $Xm$ and $Wn^m$ are prepared by the number which is the same as the weight vector $Wn^m$. A 2D distance has been introduced between processing elements and near-field radius R of the processing element is set appropriately.

(c) $PEn^m MAX$ for outptting a maximum value with respect to a supplied local pattern $X^m$ is detected, and then the weight vector $Wn^m$ with respect to PE, the distance of which from $PEn^m MAX$ is shorter than R, is modified by the following equation:

$$Wn^m \leftarrow Wn^m + \eta w (X^m - Wn^m MAX)$$

where $\eta w$ is an arbitrary constant. As the weight vector is modified, the near-field radius R of PE is gradually decreased.

Thus, the local pattern having high appearance probability is, as the weight vector, stored in the learning vector quantizer. Encoding of the local pattern is given as the index of PE which outputs the maximum value.

In the execution mode of the quantizer 206, the feature vector near the feature is supplied to the foregoing learning vector quantizer to make the index of the processing element among $\{PEn^m\}n$ that outputs a maximum value to be a code word. As a result of the foregoing process, an appropriate set of code words is made to correspond to all features.

The thus-given image is encoded as a set of the coordinates of the position of the feature and the code word of the local pattern. However, the foregoing encoding contains considerable redundancy in a sense that intense correlation exists between local patterns which are spatially adjacent. It is preferable that the representative vector of the quantizer 206 does not contain the foregoing redundancy. The foregoing redundancy can be reduced by using the simultaneous appearance probability between the representative vectors.

Hopfield-type Neural Network 207

Figure 12:
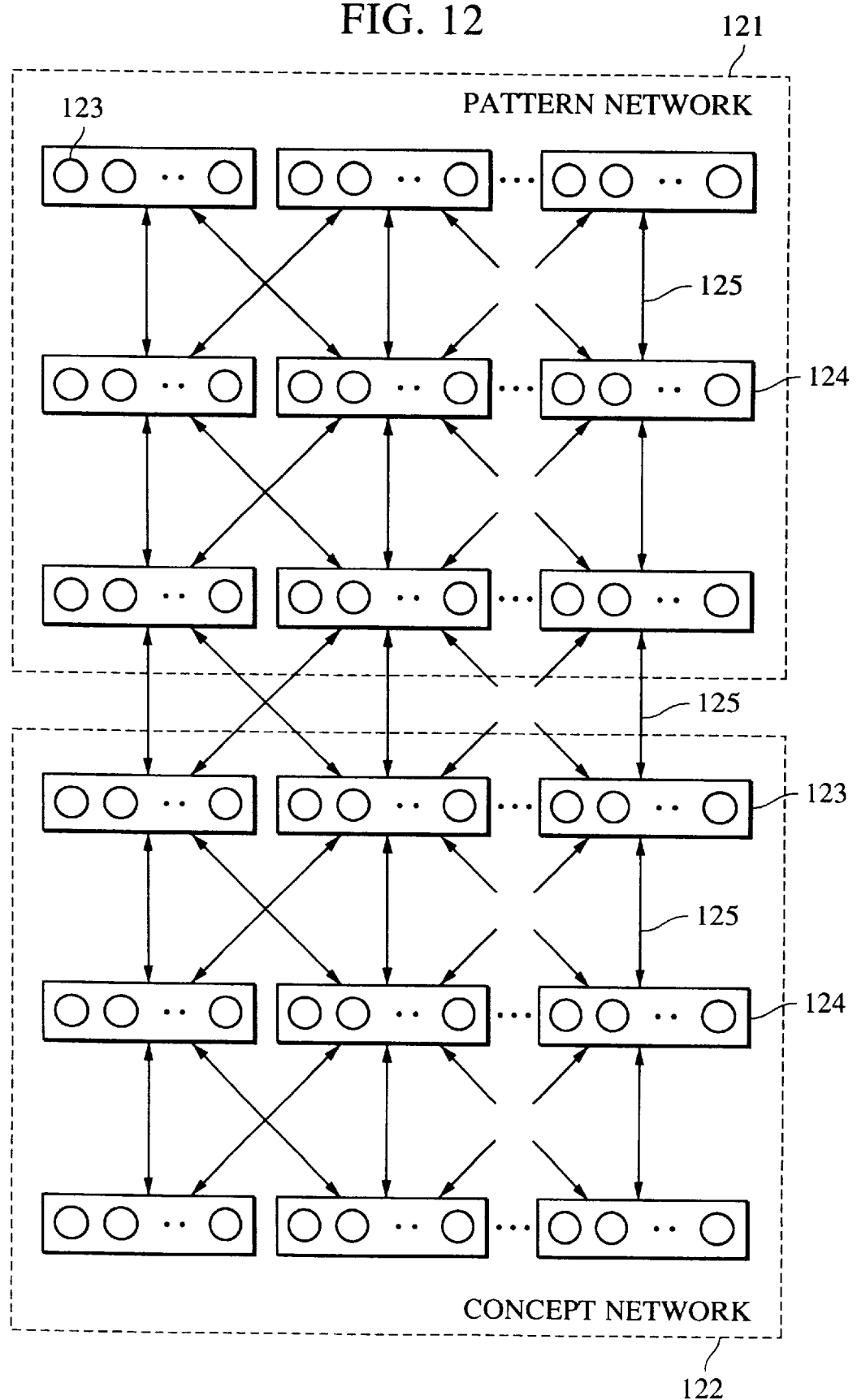
FIG. 12 is a diagram showing an example of a Hopfield-type neural network.

FIG. 12 shows the structure of a Hopfield-type neural network 207. Referring to FIG. 12, a pattern network 121 is a network constituted in accordance with the geometric characteristic and the time correlation of the supplied image data. A concept network 122 is a network constituted by a result of the pattern network and another input signal, for example, knowledge data from a human being by using, for example, a keyboard, another sensor signal or the like.

A neuron 123 is a processing element of a multiple-input and one-output. Input vector x and output value y are combined in the following relationship by using weight vector w:

$$y = \text{sgm}(W^T x) \tag{28}$$

sgm (·) is a sigmoidal function. The output value from the neuron denotes the appearance probability of a pattern corresponding to the neuron or the concept.

Reference numeral 124 represents a neuron group in the form of a set of neurons competing to each other. Reference numeral 125 represents weight $Wj,k$ connecting neuron j and neuron k. The neuron group is in the form of a hierarchy structure, and a plurality of blocks are formed in each hierarchy. Neuron group in block r in the layer (q) is written as $\Omega^{(q):r}$ and neuron group in block v in layer (q+1) is written as $\Omega^{(q+1):r}$. The neuron group belonging to the pattern network 121 expresses a local pattern space of the multi-resolution space at the coordinates. As the initial state for the pattern network 121, data from the quantizer 206 is set.

The action of the Hopfield-type neural network 207 having the foregoing structure is controlled by an energy function defined by the following equation. That is, assuming that the output value from the neuron belonging to each block is $Vm \in \Omega^{(q):r}$, $Vn \in \Omega^{(q+1):r}$, it is defined as follows:

$$Hv^{(q+1):(q)} = (C_o/2)\sum_n \left(\sum_m W_{m,m}V_m - V_n\right)^2 + \\ (C_1/2)\sum_m (V_m - I_m)^2 + (C_2/2)\sum_n (V_n - I_n)^2 + \\ (C_3/2)\left(\sum_n V_m - 1\right)^2 + (C_4/2)\sum_m V_n(1 - V_n) \tag{29}$$

Since the weight of the pattern network 121 corresponds to the weight for use in the learning vector quantizer, the value of the weight for use in the learning vector quantization can be used. However, the weight can be acquired by the following method.

The weights for the pattern network 121 and the concept network 122 can be acquired as follows: considering Equation (29) as the learning potential function, the quantity of modification of the weight is as follows:

$$\frac{dW_{m,n}}{dt} = -\eta_w \frac{\partial H_v^{(q+1):(q)}}{\partial W_{m,n}} \\ = -\eta_w C_o \left(V_m V_n - \sum_m V_m V_m \cdot W_{m,n}\right) \tag{30}$$

Input Parameter Controller 208

The mutual information quantity described in the first embodiment is made to correspond to the Hopfield-type neural network and calculated as follows:

(a) Entropy $\epsilon(q): r^{(q+1):v}$ about the set $W_m{}^n$ of connections connecting the set $V_m \in \Omega^{(q):r}$ of neurons in the block r in the layer (q) of the Hopfield-type neural network and the set $V_n \in \Omega^{(q+1):v}$ of neurons in block v in layer (q+1) is calculated by the following equation:

$$\varepsilon_{(q):r}^{(q+1):v} = -\sum_m V_m \sum_n W_m^n \log W_m^n \qquad (31)$$

Since $$\sum_n W_m^n \log W_m^n$$

is a value to be calculated in the learning mode, it may be used as a known value in the process for calculating the input parameter.

(b) Entropy $\epsilon(q){:}r$ with respect to the set of $V_m \in \Omega^{(q){:}r}$ of neutrons in the block r in the layer (q) of the Hopfield-type neural network is calculated by the following equation:

$$\varepsilon_{(q):r} = -\sum_m V_m \log V_m \qquad (32)$$

(c) By using $\epsilon(q){:}r^{(q+1){:}v}$ and $\epsilon(q){:}r$, a value similar to that obtainable from Equation (25) can obtained as follows:

$$T(\epsilon^{(q).T+1}, p(\omega; AT^{(q-1)})) = -\epsilon(q){:}r^{(q+1){:}v} + \epsilon(q){:}r \qquad (33)$$

Third Embodiment

A third embodiment has a structure in which the visual-information processing apparatus according to the present invention is applied to a monitoring apparatus.

Figure 13:
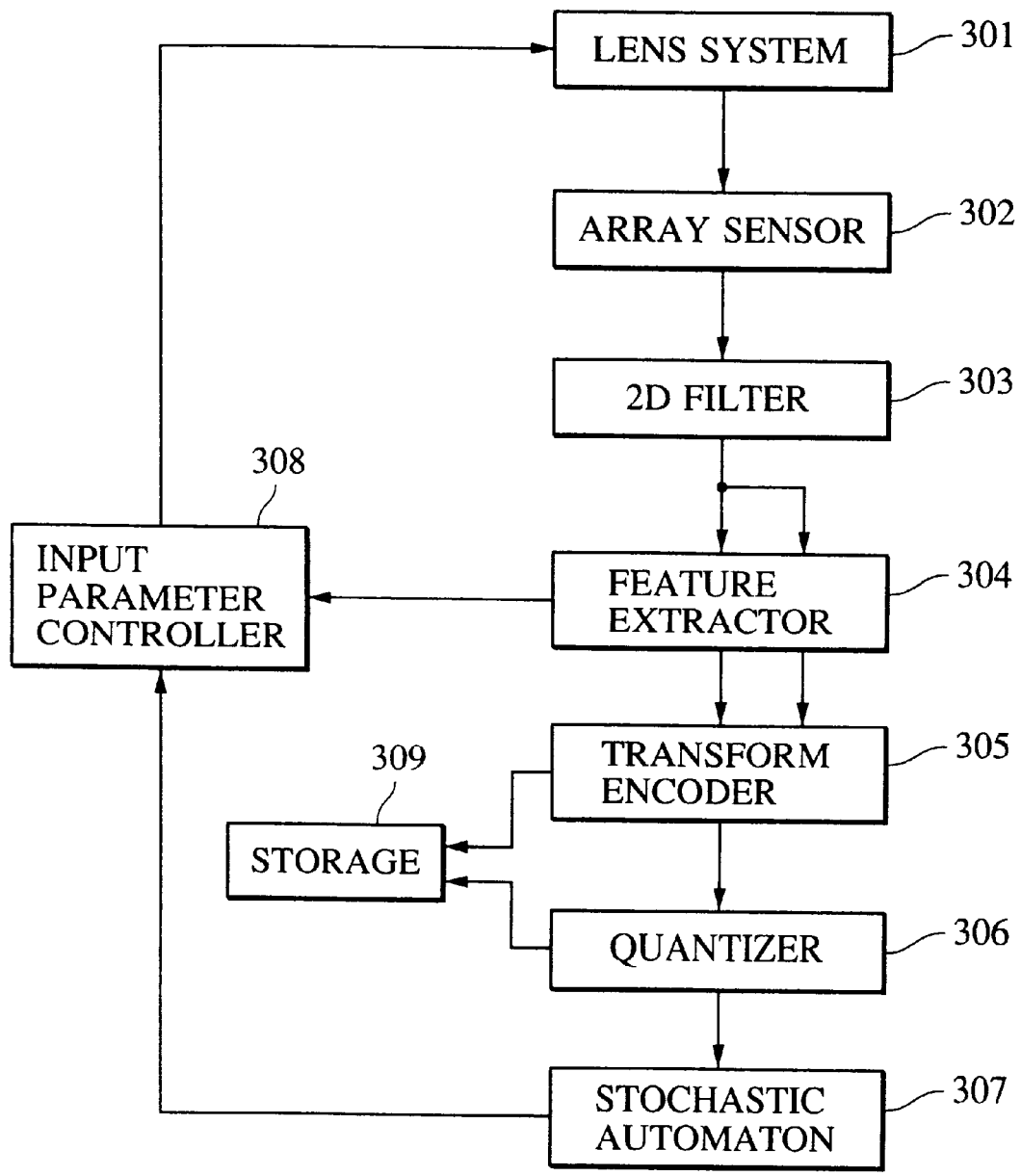
FIG. 13 is a block diagram showing an example of the structure of a monitoring apparatus according to a third embodiment.

FIG. 13 is a block diagram showing an example of the structure of a monitoring apparatus according to this embodiment. The lens system 301, the array sensor 302 and the 2D filter 303 are similar to the lens system 1, the array sensor 2 and the 2D filter 3 according to the first embodiment.

Feature Extractor 304

A feature extractor 304 detects the extreme value of time change of the image data as well as the feature about the spatial arrangement detected by the 2D filter 303. The monitoring apparatus is positioned in a place, such as a shop or an office, in which a moving object is not substantially exist in usual. If no accident takes place, image data is not changed. Therefore, a place, the image data of which has been changed, is required to be observed in detail. As a result, the time monitored information is able to record can significantly be lengthened.

In view of the foregoing, change in image data as the time passes is an important characteristic. To capture a moving object, it is preferable that the time delay in the feedback control be minimized. The feature extractor 304 has another function to calculate the optical axis control quantity with which the optical axis is caused to face the detected position of the feature so as to transmit the foregoing quantity to the input parameter controller 308. The foregoing function enables an image of an object moving on the sensor to be processed as a still image.

Transform Encoder 305

The transform encoder 305 encodes image data of a captured moving object. Encoded data is, through a communication line or a bus line, stored in an external storage unit 309.

Quantizer 306

Encoded data of captured object is immediately allotted to an appropriate code word. Therefore, if objects of the foregoing type appear on the image, the objects are expressed as their positions and corresponding code word.

Stochastic Automaton 307

Encoded data of the captured object is immediately reflected to a status transition probability matrix of the stochastic automaton 307. By knowing the intensity of a certain limited frequency region, an object including the frequency intensity function can be estimated. As a result, the position of an object, which has been captured, can be detected without high resolution data obtainable by causing the optical axis to coincide with the object. It may be observed in an arbitrary portion of the wide view lens. That is, control of the optical axis is not required. Even if a plurality of objects appear in the monitored region, they are required to be observed one time sequentially.

Input Parameter Controller 308

As criteria for selecting a feature, an output value from the 2D filter about the feature, quantity of change as the time passes and linear combination of the quantity of mutual information are employed.

As for a moving object, a standard constituted in such a manner that the moving object is observed when it appears, at the center of the optical axis, and the object is not observed at the center of the optical axis thereafter, enables a more effective observation apparatus to be realized.

External Storage Unit 309

The external storage unit 309 stores a variety of data items. The monitoring apparatus initially stores image data in a normal state. Then, it stores only portions changed as the time passes. Data to be stored is encoded data of the captured object, time of capturing, and change in the position (that is, the locus) as the time passes. As a result of the storage manners above, the quantity of data to be stored can significantly be reduced and, therefore, the image can be recorded for a long time.

Example of Operation of Monitoring Apparatus

Figure 14:
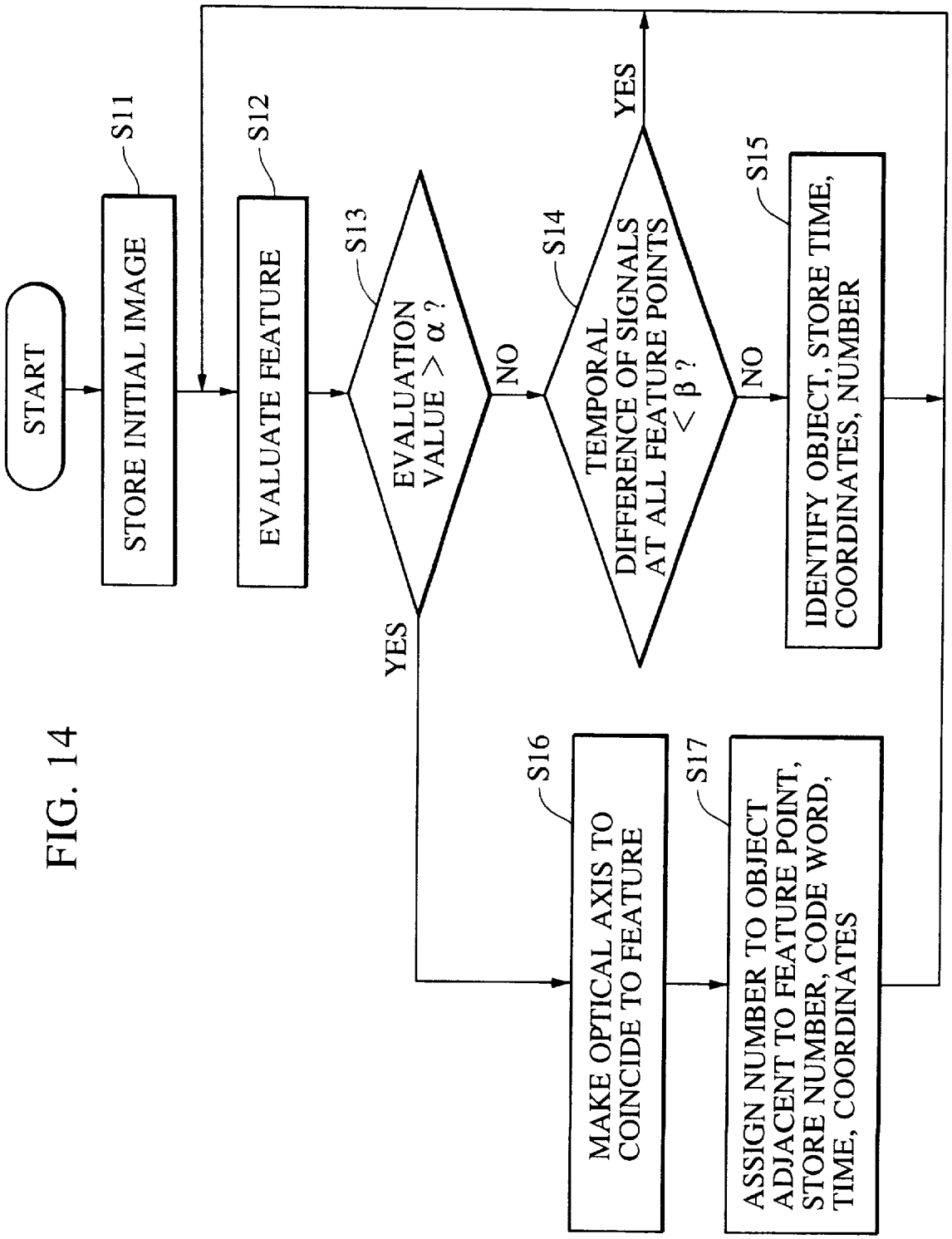
FIG. 14 is flow chart showing an example of the operation of the monitoring apparatus according to the third embodiment.

An actual operation of the monitoring apparatus having the foregoing structure will now be described with reference to a flow chart shown in FIG. 14.

In step S11 an initial image of a place, in which the monitoring apparatus has been positioned, is stored in the external storage unit 309.

In step S12 the feature is evaluated by using Equation (24). As can be understood from Equation (24), a feature, the evaluation value of which is enlarged, has characteristics that the quantity of change in the pixel value of a near portion of the feature is large as the time passes or a large quantity of information can be obtained from the feature. Even if a plurality of features having the same evaluation values about the foregoing two items exist, Equation (24) is defined to select a feature nearest the optical axis.

In step S13 if features of a type having an evaluation value higher than a certain threshold $\alpha$ exist, then the operation proceeds to step S16.

If the temporal differences of signals at all feature points are, in step S14, smaller than a certain threshold $\beta$, the operation returns to step S12.

In step S15 features of a type, the temporal difference of which is larger than a certain value β, are subject to the following process: in accordance with the code word vector (incomplete code word permissible) corresponding to the foregoing feature, a complete description about the object to be described later is used to identify the object existing in the place. Then, the present time, the coordinates of the feature and the number corresponding to the object are formed into a set, and then the set is stored in the external storage unit 309. Then, the operation returns to step S12

In step S16 the optical axis is caused to coincide with the selected feature.

In step S17 complete description (the code-word set) of the object existing near the feature point is acquired, and then appropriate number is allotted to the object. The number allotted to the object, the code word set, the time and the coordinates of the feature point are formed into a set which is then stored in the external storage unit 309. Then, the operation returns to step S12.

The proceeding of the operation to step S15 corresponds to a case where measured data of a portion near the feature point can be estimated to be data observed previously and stored in detail with satisfactory reliability in accordance with the measured data of the portion near the feature point. Therefore, the monitoring apparatus according to this embodiment is arranged to perform processes such that it performs detailed observation only when a person enters the store (steps S16 and S17); and then the monitoring apparatus stores only position information of the person (S15).

By using a monitoring apparatus of the foregoing type, a storage unit having a capacity considerably smaller than a capacity required to store time-varying images as it is enables monitoring to be performed for a long time. In a case where one image is 260 K bytes (512 pixels×512 pixels, one of which is 1 byte), storage of 108,000 sequential images (one hour because 30 images/second) required 28 G bytes. According to this embodiment, if 100 moving objects (customers in a case of the inside of a store) always exist and a capacity of one screen (260 K bytes) is required to completely describe each object, the capacity required to store the image for one hour can be reduced to 28 M bytes which is the sum of 0.26 M byte required to store the initial image, 26 M bytes to describe the objects, 1.728 M bytes to store the loci (in a case where the position of the feature is described by a 2D coordinates with double precision). In actual, a situation in which 100 persons always exist in the store cannot easily be considered. Moreover, the capacity required to describe the objects is smaller than the capacity required to store the overall image. If the objects existing in the store is decreased to 10, the capacity required to store images for one hour can significantly be reduced to 3 M bytes.

Fourth Embodiment

In the fourth embodiment, the quantizer 6 according to the first embodiment is realized by a learning local vector quantizer and the stochastic automaton 7 is realized by a symmetry-connected-type neural network group. Moreover, there are provided a signal input portion for inputting a signal from outside and a signal output portion for transmitting a signal to the outside are provided. As a result, a process to be performed by the input parameter controller is changed.

Figure 15:
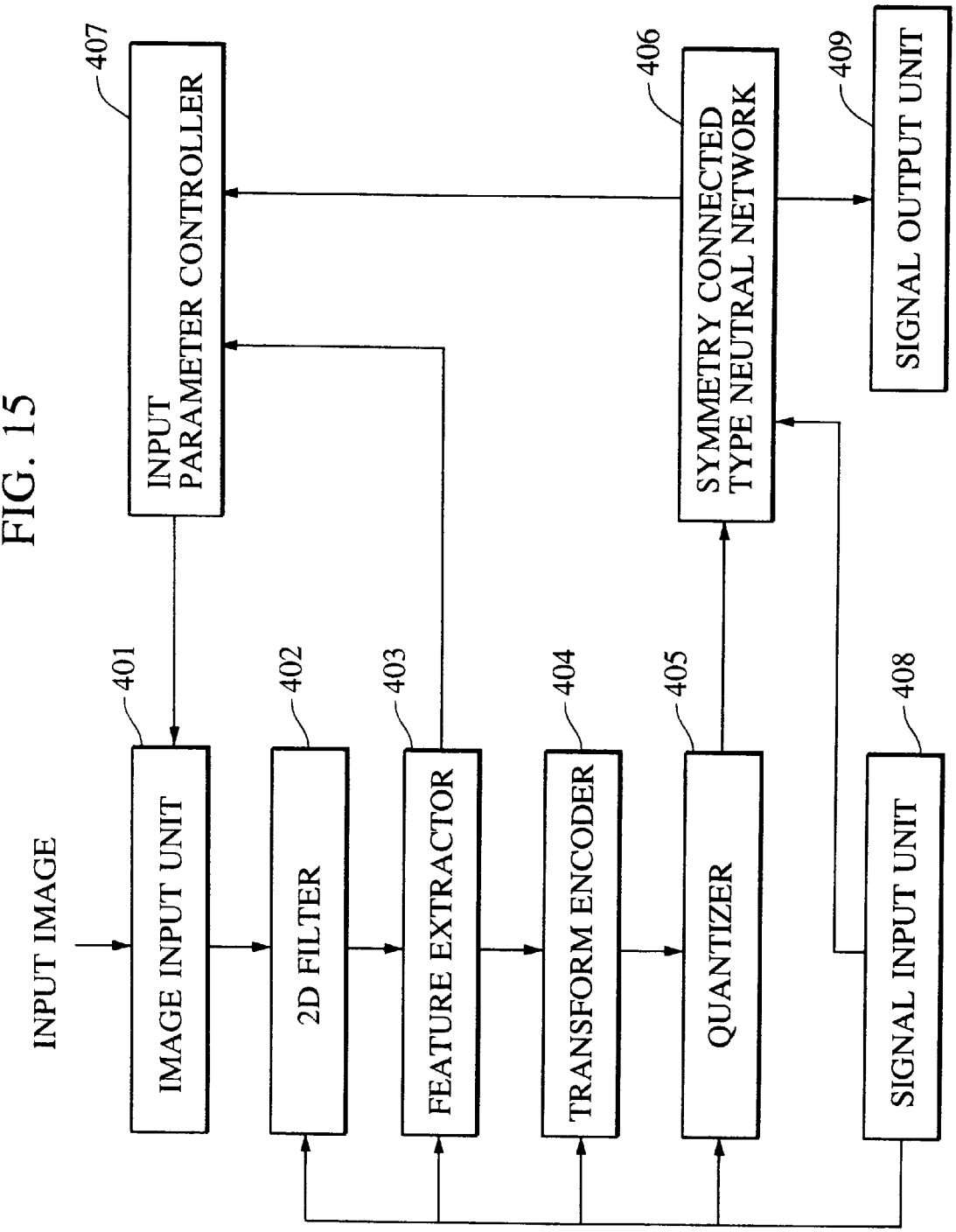
FIG. 15 is a block diagram showing an example of the structure of a visual-information processing apparatus according to a fourth embodiment.

FIG. 15 is a block diagram showing an example of the structure of a visual-information processing apparatus according to this embodiment. An image input unit 401 comprises a lens system and an array sensor similar to the lens system 1 and the array sensor 2 according to the first embodiment. A 2D filter 403, a feature extractor 404 and a transform encoder 405 are similar to the 2D filter 3, the feature extractor 4 and the transform encoder 5 according to the first embodiment.

Quantizer 406

Figure 16:
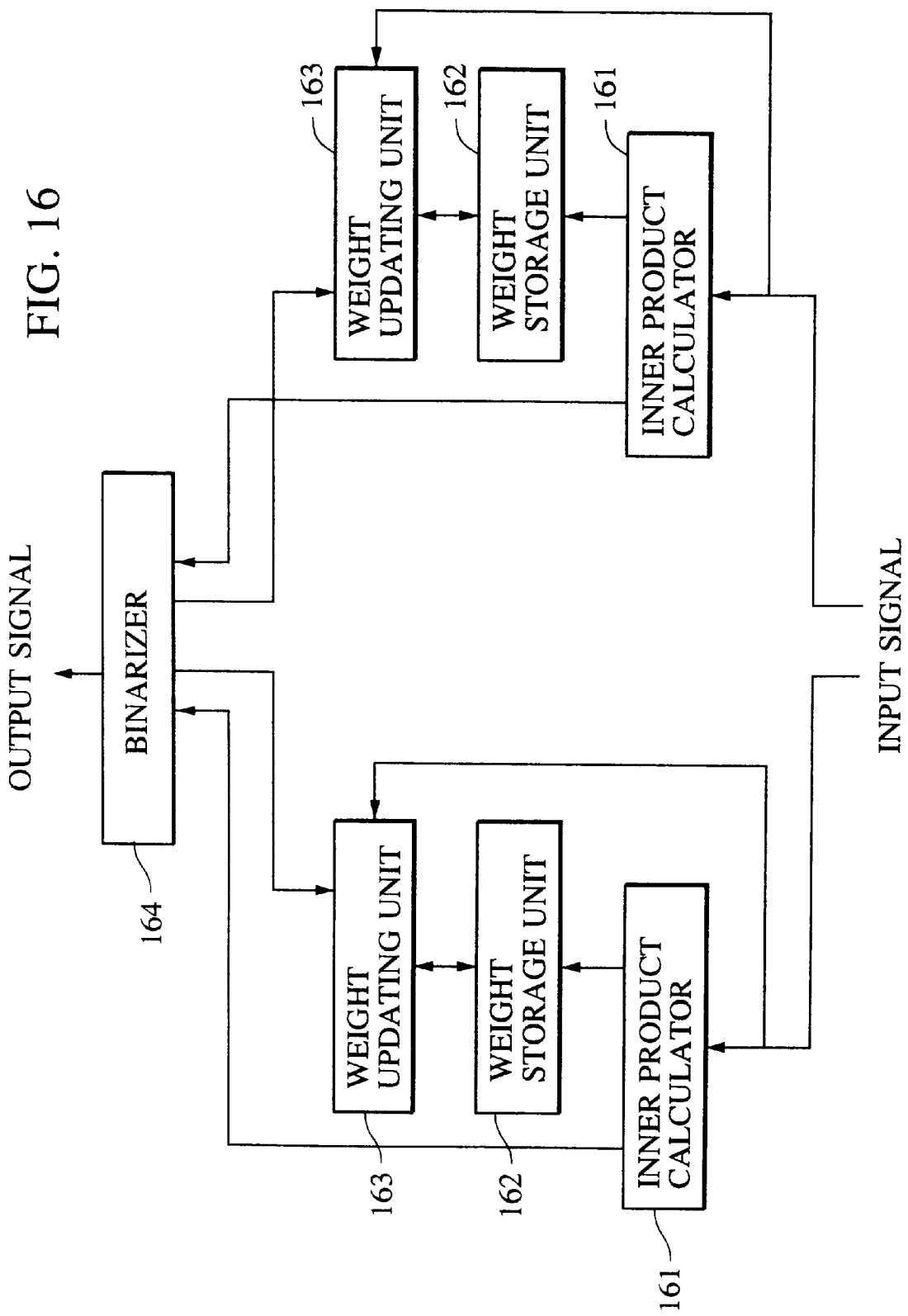
FIG. 16 is a diagram showing an example of the structure of a quantizer according to the fourth embodiment.

FIG. 16 shows the structure of a learning local vector quantizer (LLVQ) serving as the quantizer 406. The LLVQ has a learning mode for acquiring a representative vector and an execution mode for encoding the input signal. The representative vector is acquired in the learning mode by a method using a correlation matrix or a method using a learning vector quantizer suggested by Kohonen. Then, a method will now be described in which the learning vector quantizer suggested by Kohnen is used to constitute a quantizer having depth m.

(a) Weight storages 162 are previously prepared by a predetermined number to store representative vector $W_n$ belonging to a certain category n. FIG. 16 shows a case where the number of the representative vectors is two.

(b) A weight updator 163 is provided for each weight storage 162 and arranged to update the value of the weight stored in the weight storage 162 in accordance with the following equation (34) only when the signal transmitted from a binarizer 164 is "1":

$$W_n^m \leftarrow W_n^m + \eta_w (W_n^m - X^m) \qquad (34)$$

(c) An inner product calculator 161 calculates the scalar product of the input signal X and $W_n$ to transmit the result of the calculation to a binarizer 164.

(d) The binarizer 164 receives output signals from the plural inner product calculators 161 to convert the output value exhibiting the maximum value into "1" and other output values into "0". Signals (binary signals) representing the converted values respectively are transmitted to the weight updator 163. A set of the binary signals is transmitted to a symmetry-connected-type neural network group 406.

The thus-supplied image is encoded as a set of the coordinates of the position of the feature and the code word of the local pattern. However, the foregoing encoding contains considerable redundancy in a sense that an intense correlation exists between local patterns adjacent spatially. It is preferable that the representative vector of the quantizer 405 does not contain the redundancy. The foregoing redundancy can be reduced by using simultaneous appearance probability between the respective representative vectors.

Symmetry-Connected-Type Neural Network Group 406

Figure 17:
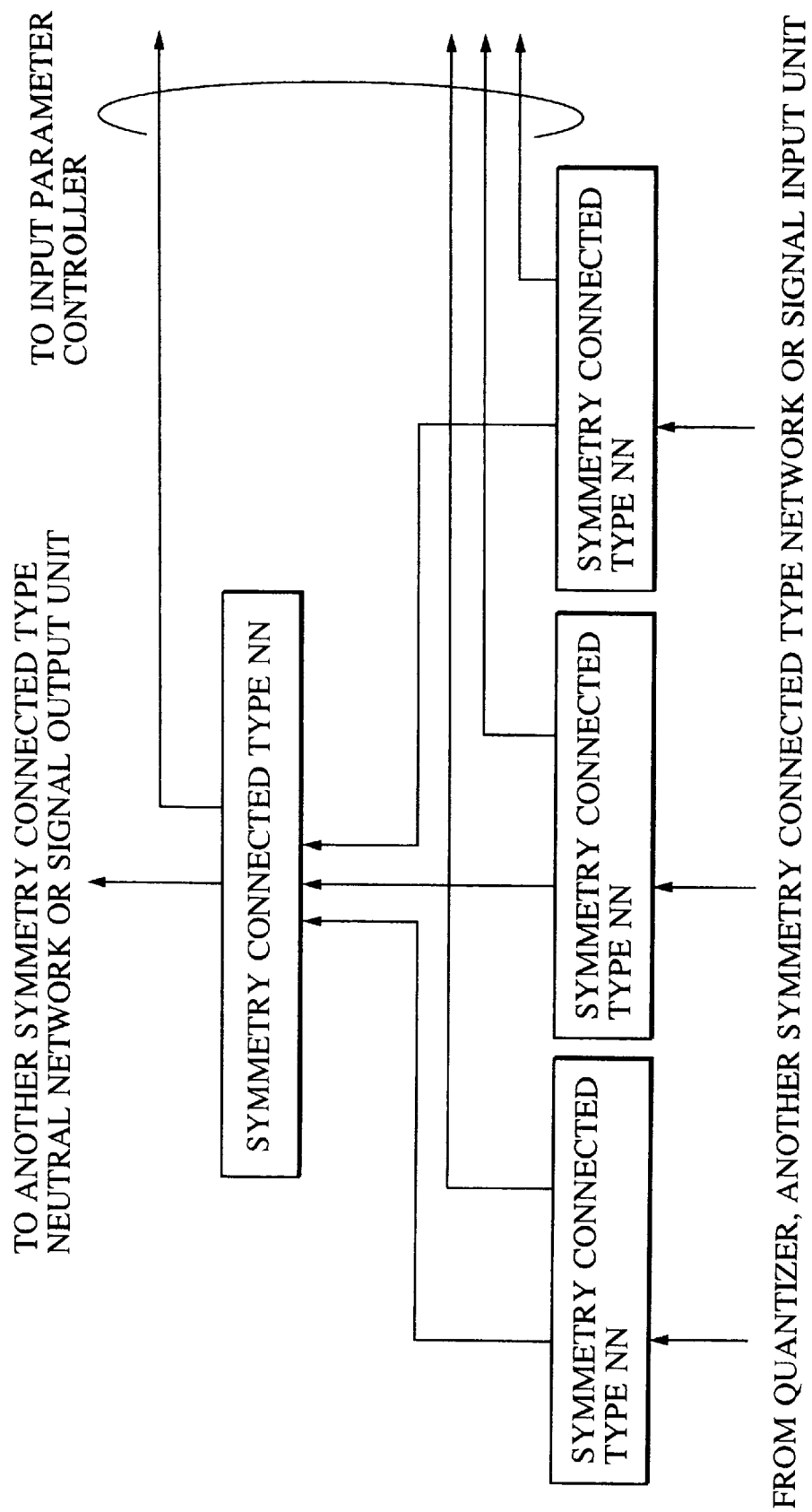
FIG. 17 is a diagram showing an example of the structure of a symmetry-connected-type neural network group.

FIG. 17 shows the structure of a symmetry-connected-type neural network group 406. The symmetry-connected-type neural network group 406 comprises a plurality of symmetry-connected-type neural networks. Each of the symmetry-connected-type neural receives a signal from another symmetry-connected-type neural network, the transform encoder 405 or a signal input portion 408 to transmit a result of the process of the input signal to another symmetry-connected-type neural network, an input parameter controller 407 or a signal output unit 409.

FIG. 18 shows the structure of one symmetry-connected-type neural network. Referring to FIG. 18, a symmetryconnected-type neural network state updator 171 has a structure comprising multiple inputs and one output and using a nonlinear input/output function realized by symmetrically connecting neurons each having a sigmoid function with each other through weights. The neuron forms at least two blocks, one of which is an output block, all of other blocks being input blocks. The set of output values from the neuron in the output block is formed into an output signal (a vector). Neurons belonging to the input block receive signals from other symmetry-connected-type neural network, the quantizer 405 or the signal input unit 408.

The motion of the neural network 207 having the foregoing structure is controlled by an energy function defined by the following equation. That is, if the output value of the neuron belonging to the output block is $V_n$, the output value of a neuron belonging to one arbitrary input block is $V_m$, the input value is Im, and the weight between the neurons is $W_{m,n}$, the energy function H can be defined as the following Equation (35):

$$Hv = (C_o/2)\sum_m \left(\sum_n W_{m,n}V_n - V_m\right)^2 + $$
$$(C_1/2)\sum_m (V_m - I_m)^2 + (C_2/2)\sum_n (V_n - I_n)^2 + $$
$$(C_3/2)\left(\sum_n V_m - 1\right)^2 + (C_4/2)\sum_m V_n(1 - V_n) \quad (35)$$

The weight updator 172 updates the weight of the neural in accordance with the weight update rule expressed by, for example, the following Equation (30);

$$\frac{dW_{m,n}}{dt} = -\eta_w \frac{\partial H}{\partial W_{m,n}} \quad (36)$$
$$= -\eta_w C_o\left(V_m V_n - \sum_n V_n V_n \cdot W_{m,n}\right)$$

The weight storage 173 stores the weight updated by the weight updator 172.

A first information quantity calculator 174 calculates first information quantity $\epsilon_1$ in accordance with the output value $V_n$ of the neuron belonging to the output block as follows:

$$\varepsilon_1 = -\sum_n V_n \log V_n \quad (37)$$

A second information quantity calculator 175 calculates second information quantity $\epsilon_2$ as follows in accordance with output value $V_n$ of the neuron belonging to the output block, output value $V_m$ of the neuron belonging to the input block and the weight $W_{m,n}$ between the foregoing neurons:

$$\varepsilon_2 = -\sum_m V_m \sum_n W_{m,n} \log W_{m,n} \quad (38)$$

Since $$\sum_n W_{m,n} \log W_{m,n}$$

is a value which can be calculated in the learning mode, it may be treated as a known value in the process for calculating the input parameter.

a third information quantity calculator 176 calculates third information quantity T as follows in accordance with the first information quantity $\epsilon_1$ and the second information quantity $\epsilon_2$:

$$T = -\epsilon_2 + \epsilon_1 \quad (39)$$

Input Parameter Controller 407

The input parameter controller 407 transmits, to the image input unit 401, an input parameter control signal for controlling the direction of the optical axis of the lens, zooming and the like in accordance with the coordinates of the feature supplied from the feature extractor 403 and the symmetry-connected-type neural network group 406.

For example, control of the direction of the optical axis depends upon the selection of a feature in a set of features detected by the feature extractor 403. The selection criterion is defined by, for example, the following Equation (40):

$$L_j = L(\omega_j, T_j, \rho_j) \quad (40)$$

where $\omega_j$ is an output value from a normalized 2D filter near the j-th feature, $T_j$ is a third information quantity near the j-th feature and $\rho_j$ is the distance from the present optical axis to the j-th feature.

The signal input unit 408 receives an input signal from another apparatus, for example, knowledge data supplied from a human being using, for example, a keyboard or a signal from another sensor. The signal output unit 409 transmits an output signal from the symmetry-connected-type neural network group 406 to another unit or apparatus except the input parameter controller 407 of the visual-information processing apparatus.

By combining the visual-information processing apparatus according to this embodiment with another apparatus, a variety of methods of use can be performed.

For example, during observation of the face of a human being combined with wireless signal apparatus or a wired signal apparatus, input of name of the human being with a wired signal or a wireless signal enables the image data of the face and name to be stored in such a manner that they are associated with each other. The foregoing process is not limited to the face of a human being in a sense that a tag is attached to an image. When the visual-information processing apparatus according to the present invention is combined with a voice signal input apparatus to associate the image with the voice signal, accuracy in recognizing the image can be improved.

The voice signal input apparatus and a voice signal processing apparatus are not limited to the voice of human beings. For example, supersonic waves may be employed. In the foregoing case, a supersonic sensor enables information about the distance to the ambient object to be obtained. Therefore, an autonomic running robot can be constituted by using visual information and distance information.

The voice signal input apparatus and a voice signal processing apparatus can be used to perform communication among a plurality of autonomic running robots or a plurality of monitoring apparatuses. For example, a case is considered in which the inside of a building cannot be monitored by one monitoring apparatus. An assumption is performed that a monitoring apparatus j has detected a moving object and observed in detail the object. When the moving object is moved to the outside of the region which can be observed by the monitoring apparatus j and is about to be introduced into the region which can be observed by a monitoring apparatus k, transmission of information from the monitoring apparatus j to the monitoring apparatus k that detailed data of the moving object which has introduced from the region which can be observed by the monitoring apparatus j into the region which can be observed by the monitoring apparatus k has acquired by the monitoring apparatus j results in the monitoring apparatus k being omitted from performing detailed observation of the moving object. The foregoing structure is effective to reduce quantity of data to be stored and the work to be done by the monitoring apparatus.

If the visual-information processing apparatus according to the present invention is combined with a vehicle robot for transporting parts or the like in a manufacturing plant or the like, a vehicle robot capable of flexibly adapting to the environment can be realized. Also combination with a voice signal output apparatus can be realized.

According to the present invention, the method and apparatus for processing visual information can be provided which are capable of quickly acquiring optimum visual information. Moreover, a variety of apparatuses to which the method and apparatus for processing visual information according to the present invention are adapted can be provided.

Specifically,

1. According to the present invention, if image input cannot easily be continued due to some reasons, a result exhibiting the highest appearance probability can be obtained. Since the foregoing operations can be processed in parallel, the time required to complete the operations can significantly be shortened. Since the foregoing structure is constituted by the Hopfield-type neural network, the status transition rule can be simplified and the time required to complete the process can furthermore be shortened.

2. It is preferable that the set of features of an image be a set of finite number of points. However, since the edge used widely as the feature quantity with the conventional technique is continuous, a certain post-process is required, for example, the intensity of the edge must be binarized to obtain finite number of point sets. According to the present invention, a feature point can be obtained as an isolated point. Moreover, the transform encoder, the quantizer and knowledge acquiring unit are able to treat the sensor input and the knowledge data in a unified manner. As a result, the structure of the present invention can be applied to recognize the environment constituted by complicated vision patterns.

3. By using a Laplacian-Gussian filter as the 2D filter, visual information of the environment can approximately transformed to a multi-resolution subspace. By appropriately controlling the direction of the optical axis, description in a multi-resolution subspace of an image or an environment can approximately be obtained. If a simple averaging process is employed as the 2D filter, description in the multi-resolution approximation with respect to a partial domain of an image or an environment can be obtained. If the kernel for use in the multi-resolution space is used as that of the 2D filter, a corresponding multi-resolution space can be obtained approximately. The foregoing structure is an effective sensing method in a case where visual information of the environment covers a partial domain of a multi-resolution space.

4. A feed-forward-type neural network enables high-speed feed-forward control, the speed of which is higher than the Hopfield-type neural network, to be performed.

5. A multi-resolution space is employed as the feature quantity space and attention is paid to the local pattern in the foregoing space so that an invariant with respect to a specific motion of an object existing in the environment can be obtained. For example, the motion along the optical axis is only shift of the feature quantity of an object along the scale axis.

6. By combining a voice signal input apparatus and a voice signal processing apparatus, a command can be transmitted from a human being by means of voice or an obstacle can be identified by means of sound. By combining a wireless signal communication apparatus and a wireless signal processing apparatus or a wired signal communication apparatus and a wired signal processing apparatus, commands can be transmitted/received to and from another computer or information can be transmitted/receiver to and from another visual-information processing apparatus. The knowledge acquiring unit is able to control the input parameter in response to the voice signal, the wireless signal and the wired signal. Thus, an object which has not been impossible to be recognized in response to a sole signal can be recognized. Moreover, knowledge data is received from another visual-information processing apparatus so that time required to perform the process in the learning mode is shortened.

7. By combining a working tool and an apparatus for controlling the working tool, an operation adaptable to the state of the environment can be performed. In a case where the execution of the operation considerably depends upon the environment, a group work with an autonomic operation robot can be performed effectively.

8. By combining with a voice signal output apparatus, the state of the user can be informed to surrounding persons. Thus, an autonomic robot adaptable to a group work with human beings can be constituted.

The foregoing invention may be applied to a system comprising a plurality of apparatuses or applied to a specific apparatus in a system. The present invention may be applied in a case where a computer performs a program to achieve an object. The program may be supplied from an external storage medium. Also the storage medium for storing the program is within the spirit of the present invention.

Although the prevent invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A method of controlling an image information processing apparatus comprising the steps of:

optically receiving an image from an image input unit of said image information processing apparatus;

obtaining partial images by segmenting the received image;

determining a probable local pattern and an appearance probability thereof for each of the partial images;

detecting at least one feature point from the received image;

calculating a quantity of mutual information between each feature point and a current observation point on a basis of appearance probabilities of local patterns for respective partial images including the feature point and the current observation point;

calculating a quantity of visual information for each feature point in accordance with the quantity of mutual information between respective feature points and the current observation point and with a distance between the current observation point and the respective feature points;

determining a feature point corresponding to a maximum quantity of visual information as a next observation point; and moving the image input unit so that the optical axis matches the next observation point.

2. A method of controlling an image information processing apparatus according to claim 1, wherein zooming of the image input unit is performed in said moving step.

3. A method of controlling an image information processing apparatus according to claim 1, wherein the quantity of visual information is, in said second calculating step, calculated in a Hopfield-type neural network in accordance with entropy.

4. A method according to an image information processing apparatus according to claim 1, wherein the partial images are, in said obtaining step, obtained to the extent of a predetermined depth in a multi-resolution space.

5. A method of controlling an image information processing apparatus according to claim 4, wherein said obtaining step includes a step for causing a supplied image to be discrete and a step for masking the discrete 2D image.

6. A method of controlling an image information processing apparatus according to claim 1, wherein a wide view lens is, in said optically receiving step, used to transform the coordinates of the received image into a direction perpendicular to said wide view lens.

7. A method of controlling an image information processing apparatus according to claim 1, wherein the quantity of visual information is, in said second calculating step, calculated by a plurality of symmetry-connected-type neural networks for mutually transmitting/receiving signals.

8. An image information processing method comprising the steps of:

monitoring a supplied image;

detecting at least one feature point from the supplied image;

extracting an image information in a neighborhood of each feature point;

calculating an evaluation value of each feature point in accordance with the image information in a neighborhood of a respective feature point and a distance between an optical axis and the respective feature point;

selecting a feature point one by one, the evaluation value of which is higher than a predetermined value;

moving a direction of an optical axis to the selected feature point;

acquiring data of an image after moving the optical axis to the selected feature point; and allotting an identifier to the acquired image data and storing a set formed by the position of the selected feature point, data of the acquired image, time of detection and the allotted identifier.

9. An image information processing method according to claim 8, further comprising the steps of:

determining a feature point, the evaluation value of which is higher than a second predetermined value;

identifying an identifier allotted to an image in accordance with the position of the determined feature point; and storing a set formed by the position of the determined feature point, time of determination and the identified identifier.

10. An image information processing method according to claim 8 wherein in a case where a plurality of features have been detected in said detection step, the optical axis is, in said moving step, moved toward a feature nearest the present optical axis.

11. An image information processing apparatus comprising:

image input means for optically inputting an image;

obtaining means for obtaining partial images by segmenting the received image;

first determination means for determining a probable local pattern and an appearance probability thereof for each of the partial images;

detection means for detecting at least one feature point from the image received by said image input means;

first calculating means for calculating a quantity of mutual information between each feature point and a current observation point on a basis of appearance probabilities of local patterns for respective partial images including the feature point and the current observation point;

second calculating means for calculating a quantity of visual information for each feature point in accordance with the quantity of mutual information between respective feature points and the current observation point and with a distance between the current observation point and the respective feature points;

second determination means for determining a feature point corresponding to a maximum quantity of visual information as a next observation point; and moving means for moving said image input means so that the optical axis matches the next observation point.

12. An image information processing apparatus according to claim 11 wherein said moving means performs zooming of said image input means.

13. An image information processing apparatus according to claim 11, wherein said second calculating means has a Hopfield-type neural network to calculate the quantity of visual information in accordance with entropy of said Hopfield-type neural network.

14. An image information processing apparatus according to claim 11, wherein said obtaining means obtains the partial images to the extent of a predetermined depth in a multi-resolution space.

15. An image information processing apparatus according to claim 14, wherein said obtaining means includes discrete means for causing the supplied image to be discrete and a filter for masking the discrete 2D image.

16. An image information processing apparatus according to claim 11 wherein said input means has a wide view lens to transform the coordinates of the received image in a direction perpendicular to said wide view lens.

17. An image information processing apparatus according to claim 11, wherein said second calculating means has a plurality of symmetry-connected-type neural networks for mutually transmitting/receiving signals.

18. An image processing apparatus comprising:

monitoring means for monitoring a supplied image;

detection means for detecting at least one feature point from the supplied image;

extraction means for extracting an image information in a neighborhood of each feature point;

calculating means for calculating an evaluation value of each feature point in accordance with the image information in the neighborhood of a respective feature point and a distance between an optical axis and the respective feature point;

selection means for selecting a feature point one by one, the evaluation value of which is higher than a predetermined value;

moving means for moving a direction of an optical axis to the selected feature point;

acquiring means for acquiring data of an image after moving the optical axis to the selected feature point by said moving means; and storage means which allots an identifier to the acquired image data so as to store a set formed by a position of the selected feature point, data of the acquired image, time of detection and the allotted identifier.

19. An image information processing apparatus according to claim 18, further comprising:

determining means for determining a feature point, the evaluation value of which is higher than a second predetermined value;

identifying means for identifying an identifier allotted to an image in accordance with the position of the determined feature point; and second storage means for storing a set formed by the position of the determined feature point, time of determination and the identified identifier.

20. An image information processing apparatus according to claim 18, wherein in a case where a plurality of features have been detected by said detection means, said moving means moves the optical axis toward a feature nearest the present optical axis.

21. A method of controlling an image information processing apparatus, comprising the steps of:

optically receiving an image from an image input unit of said image information processing apparatus;

detecting a feature from the received image;

calculating a quantity of visual information in accordance with a position of the detected feature; and controlling the image input unit in such a manner that the quantity of visual information is enlarged, wherein the quantity of visual information is, in said calculating step, calculated in accordance with a quantity of mutual information between different cells in a stochastic automaton containing a plurality of cells.

22. A method of controlling an image information processing apparatus, comprising the steps of:

optically receiving an image from an image input unit of said image information processing apparatus;

detecting a feature from the received image;

calculating a quantity of visual information in accordance with a position of the detected feature; and controlling the image input unit in such a manner that the quantity of visual information is enlarged, wherein said detection step has a step of generating a vector field from a function expressing a supplied image and a step in which the vector field is expressed as a function of a complex variable, and then an argument principle is used so as to detect a feature as a singular point.

23. A method of controlling an image information processing apparatus, comprising the steps of:

optically receiving an image from an image input unit of said image information processing apparatus;

detecting a feature from the received image;

calculating a quantity of visual information in accordance with a position of the detected feature; and controlling the image input unit in such a manner that the quantity of visual information is enlarged, wherein the quantity of visual information is, in said calculating step, calculated by a plurality of symmetry-connected-type neural networks for mutually transmitting/receiving signals, and wherein the symmetry-connected-type neural network includes one output neuron block and at least one input neuron block, and said calculating step includes:

a step of calculating a first information quantity in accordance with an output value from the output neuron block, a step of calculating a second information quantity in accordance with an output value from the input neuron block and a weight for connecting the input neuron block and the output neuron block with each other, and a step of calculating the quantity of visual information in accordance with the first information quantity and the second information quantity.

24. An image information processing apparatus comprising:

image input means for optically inputting an image;

detection means for detecting a feature from the image input by said image input means;

calculating means for calculating a quantity of visual information in accordance with a position of the feature detected by said detection means; and control means for controlling said image input means in such a manner that the quantity of visual information calculated by said calculating means is enlarged, wherein said calculating means has a stochastic automaton including a plurality of cells to calculate the quantity of visual information in accordance with quantity of mutual information between different cells.

25. An image information processing apparatus comprising:

image input means for optically inputting an image;

detection means for detecting a feature from the image input by said image input means;

calculating means for calculating a quantity of visual information in accordance with a position of the feature detected by said detection means; and control means for controlling said image input means in such a manner that the quantity of visual information calculated by said calculating means is enlarged, wherein said detection means has generating means for generating a vector field from a function expressing a supplied image and singular point detection means which expresses the vector field in a form of a function of a complex variable and which uses an argument principle so as to detect a feature as a singular point.

26. An image information processing apparatus comprising:

image input means for optically inputting an image;

detection means for detecting a feature from the image input by said image input means;

calculating means for calculating a quantity of visual information in accordance with a position of the feature detected by said detection means; and control means for controlling said image input means in such a manner that the quantity of visual information calculated by said calculating means is enlarged, wherein said calculating means has a plurality of symmetry-connected-type neural networks for mutually transmitting/receiving signals, and wherein said symmetry-connected-type neural network includes one output neuron block and at least one input neuron block, and said calculating means includes:
   first calculating means for calculating a first information quantity in accordance with an output value from said output neuron block,
   second calculating means for calculating a second information quantity in accordance with an output value from said input neuron block and a weight for connecting said input neuron block and said output neuron block with each other, and
   third calculating means for calculating the quantity of visual information in accordance with the first information quantity and the second information quantity.

* * * * *

UNITED STATES PATENT AND TRADEMARK OFFICE
CERTIFICATE OF CORRECTION

PATENT NO. : 6,115,480
DATED : September 5, 2000
INVENTOR(S) : Teruyoshi Washizawa It is certified that error appears in the above-identified patent and that said Letters Patent is hereby corrected as shown below:

ON THE TITLE PAGE:

[56] References Cited, under OTHER PUBLICATIONS
After "Bandera et al." "586-599," should read --596-599,--;
After "A New Neutral" "Coordination-"," should read --Coordination"--; and
After "A Renormalization" "No. 2,," should read --No. 2,--.

Column 1:
Line 11, "autonimic" should read --autonomic--.

Column 2:
Line 39, "(1994)." should read --(1994)).--.

Column 3:
Line 16, "Saccade" should read --"Saccade--.

Column 5:
Line 22, "according" should read --according to--;
Line 29, "is" should read --is a--; and
Line 58, "may however" should read --may, however,--.

Column 6:
Line 4, "and" should read --and the--; and
Line 20, "lends" should read --lens--.

Column 7:
Line 54, "-1n)" should read ---1,n--.

UNITED STATES PATENT AND TRADEMARK OFFICE
CERTIFICATE OF CORRECTION

PATENT NO.   : 6,115,480
DATED         : September, 5, 2000
INVENTOR(S)  : Teruyoshi Washizawa It is certified that error appears in the above-identified patent and that said Letters Patent is hereby corrected as shown below:

Column 8:
Line 57, "is" should read --are--; and
Line 61, "is" should read --are--.

Column 10:
Line 22, "b0, (S2(so, b)), S2(S1,b0)," should read --(b0, (S2(s0,b0),--; and
Line 29, "gives" should read --gives a--.

Column 14:
Line 29, "is" should read --are--;
Line 35, "=0.171," should read --=0.171,        (27)--; and
Line 44, "are" should read --is--.

Column 16:
Line 11, "sgm" should read --where sgm--.

Column 17:
Line 27, "$AT^{(q-1)}))=$" should read --$AT^{(q+1)}))=$--;
Line 45, "is not substantially" should read --does not usually--;
Line 46, "exist in usual." should read --exist.--; and
Line 49, "record" should read --record and--.

UNITED STATES PATENT AND TRADEMARK OFFICE
CERTIFICATE OF CORRECTION

PATENT NO.     : 6,115,480
DATED          : September, 5, 2000
INVENTOR(S)    : Teruyoshi Washizawa It is certified that error appears in the above-identified patent and that said Letters Patent is hereby corrected as shown below:

Column 18:
Line 2, "of" should read --of a--.

Column 19:
Line 10, "S12" should read --S12.--; and
Line 15, "then" should read --then the--.

Column 20:
Line 17, "Kohnen" should read --Kohonen--;
Line 48, "adjacent spatially." should read --spatially adjacent.--; and
Line 60, "neural" should read --neural network--.

Column 21:
Line 5, "of" (second occurrence) should read --of the--;
Line 29, "neural" should read --neurons--; and
Line 31, "(30);" should read --(36):--.

Column 22:
Line 1, "a" should read --A--; and
"calculates" should read --calculates a--.

UNITED STATES PATENT AND TRADEMARK OFFICE
CERTIFICATE OF CORRECTION

PATENT NO.    : 6,115,480
DATED         : September, 5, 2000
INVENTOR(S)   : Teruyoshi Washizawa Page 4 of 4

It is certified that error appears in the above-identified patent and that said Letters Patent is hereby corrected as shown below:

Column 23:
Line 40, "obtain" should read --obtain a--; and
Line 48, "approximately" should read --approximately be--.

Column 24:
Line 3, "only" should read --only a--;
Line 12, "receiver" should read --received--; and
Line 38, "prevent" should read --present--.

Column 25:
Line 13, "according to" should read --of controlling--; and
Line 64, "claim 8" should read --claim 8,--.

Column 26:
Line 28, "claim 11" should read --claim 11,--;
Line 44, claim 11" should read --claim 11,--; and
Line 51, "image" should read --image information--.

Signed and Sealed this

Twelfth Day of June, 2001

*Attest:*

NICHOLAS P. GODICI
*Attesting Officer*   Acting Director of the United States Patent and Trademark Office